US012485991B2

(12) United States Patent
Ooishi et al.

(10) Patent No.: US 12,485,991 B2
(45) Date of Patent: Dec. 2, 2025

(54) METHOD FOR CONTROLLING HUMAN-POWERED VEHICLE AND CONTROL DEVICE FOR HUMAN-POWERED VEHICLE

(71) Applicant: Shimano Inc., Osaka (JP)

(72) Inventors: Toshinari Ooishi, Osaka (JP); Koujirou Morii, Osaka (JP)

(73) Assignee: Shimano Inc., Osaka (JP)

( * ) Notice: Subject to any disclaimer, the term of this patent is extended or adjusted under 35 U.S.C. 154(b) by 32 days.

(21) Appl. No.: 18/384,305

(22) Filed: Oct. 26, 2023

(65) Prior Publication Data

US 2024/0166291 A1 May 23, 2024

(30) Foreign Application Priority Data

Nov. 21, 2022 (JP) ................. 2022-185999

(51) Int. Cl.
| | | |
|---|---|---|
| B62J 45/20 | (2020.01) | |
| B62J 45/412 | (2020.01) | |
| B62J 45/413 | (2020.01) | |
| B62J 45/415 | (2020.01) | |

(52) U.S. Cl.
CPC ............. *B62J 45/20* (2020.02); *B62J 45/412* (2020.02); *B62J 45/413* (2020.02); *B62J 45/4151* (2020.02)

(58) Field of Classification Search
None
See application file for complete search history.

(56) References Cited

U.S. PATENT DOCUMENTS

| | | | | |
|---|---|---|---|---|
| 9,663,177 | B2* | 5/2017 | Craven | B62J 50/21 |
| 2015/0197308 | A1* | 7/2015 | Butora | B62K 25/20 |
| | | | | 280/283 |
| 2019/0232968 | A1* | 8/2019 | Reynolds | A61B 5/1071 |
| 2020/0148298 | A1* | 5/2020 | Hara | B62M 25/08 |
| 2020/0346706 | A1* | 11/2020 | Isenschmid | G08G 1/166 |
| 2022/0001951 | A1* | 1/2022 | Preis | B62J 45/414 |

(Continued)

FOREIGN PATENT DOCUMENTS

| | | | | | |
|---|---|---|---|---|---|
| CN | 108128112 | A | * | 6/2018 | ........... B60G 17/015 |
| CN | 112292647 | A | * | 1/2021 | ............. B62D 37/06 |

(Continued)

*Primary Examiner* — Fekadeselassie Girma
(74) *Attorney, Agent, or Firm* — Global IP Counselors, LLP

(57) ABSTRACT

A method is performed for controlling a human-powered vehicle. The method includes calculating a first movement amount of the human-powered vehicle on a road from at least one of a rotational speed of a wheel of the human-powered vehicle and a rotational amount of the wheel. The method further includes calculating a second movement distance in an advancing direction of the human-powered vehicle and a horizontal direction from the first movement distance and a pitch angle of the human-powered vehicle and calculating a third movement distance related to movement in the advancing direction of the human-powered vehicle and a vertical direction from the first movement distance and the pitch angle. The method further includes predicting a terrain of the road from the second movement distance and the third movement distance.

22 Claims, 17 Drawing Sheets

(56) References Cited

U.S. PATENT DOCUMENTS

| | | | |
|---|---|---|---|
| 2023/0136706 A1* | 5/2023 | Higashi | B62M 6/50 180/206.3 |
| 2024/0132071 A1* | 4/2024 | Fuhs | B60W 10/18 |
| 2024/0149974 A1* | 5/2024 | Nomura | B62M 6/50 |
| 2024/0166291 A1* | 5/2024 | Ooishi | B62J 45/4152 |
| 2025/0229860 A1* | 7/2025 | Patrick | B62J 45/41 |

FOREIGN PATENT DOCUMENTS

| | | | | |
|---|---|---|---|---|
| CN | 114137964 A | * | 3/2022 | G05D 1/0246 |
| CN | 114199188 A | * | 3/2022 | G01C 21/08 |
| CN | 119354494 A | * | 1/2025 | |
| EP | 3652054 B1 | | 7/2021 | |
| JP | 2015143979 A | * | 8/2015 | G01S 17/42 |
| JP | 2019168290 A | * | 10/2019 | G01S 13/42 |

\* cited by examiner

METHOD FOR CONTROLLING HUMAN-POWERED VEHICLE AND CONTROL DEVICE FOR HUMAN-POWERED VEHICLE

CROSS-REFERENCE TO RELATED APPLICATIONS

This application claims priority to Japanese Patent Application No. 2022-185999, filed on Nov. 21, 2022. The entire disclosure of Japanese Patent Application No. 2022-185999 is hereby incorporated herein by reference.

BACKGROUND

Technical Field

The present disclosure generally relates to a method for controlling a human-powered vehicle and a control device for a human-powered vehicle.

Background Information

European Patent No. 3652054 discloses an example of a control device for a human-powered vehicle that predicts curving of a road on which the human-powered vehicle is traveling from a roll angle of the human-powered vehicle.

SUMMARY

The control device for a human-powered vehicle disclosed in the above-mentioned European Patent is configured to predict only curving of the road on which the human-powered vehicle is traveling.

One objective of the present disclosure is to provide a method for controlling a human-powered vehicle and a control device for a human-powered vehicle that appropriately predict the terrain of a road on which the human-powered vehicle is traveling.

A method in accordance with a first aspect of the present disclosure is for controlling a human-powered vehicle. The method comprises a first process of calculating a first movement amount of the human-powered vehicle on a road from at least one of a rotational speed of a wheel of the human-powered vehicle and a rotational amount of the wheel, a second process of calculating a second movement distance in an advancing direction of the human-powered vehicle and a horizontal direction from the first movement distance and a pitch angle of the human-powered vehicle and calculating a third movement distance related to movement in the advancing direction of the human-powered vehicle and a vertical direction from the first movement distance and the pitch angle, and a third process of predicting a terrain of the road from the second movement distance and the third movement distance.

With the method according to the first aspect, the terrain of the road is predicted from the first movement distance, the second movement distance calculated from the pitch angle of the human-powered vehicle, and the third movement distance. Since the pitch angle of the human-powered vehicle is correlated to unevenness of a road on which the human-powered vehicle is traveling, the terrain of the road is appropriately predicted.

In accordance with a second aspect of the present disclosure, in the method according to the first aspect, the second process includes multiplying the first movement distance by a cosine of the pitch angle to calculate the second movement distance.

With the method according to the second aspect, the second movement distance is calculated from the first movement distance and the cosine of the pitch angle.

In accordance with a third aspect of the present disclosure, in the method according to the first or second aspect, the second process includes multiplying the first movement distance by a sine of the pitch angle to calculate the third movement distance.

With the method according to the third aspect, the third movement distance is calculated from the first movement distance and the sine of the pitch angle.

In accordance with a fourth aspect of the present disclosure, the method according to any one of the first to third aspects further comprises a fourth process of storing at least one of the second movement distance, the third movement distance, and the terrain predicted in the third process in storage.

With the method according to the fourth aspect, at least one of the second movement distance, the third movement distance, and the terrain of the road predicted in the third process is stored in the storage. This allows the user to check at least one of the second movement distance, the third movement distance, and the terrain of the road.

In accordance with a fifth aspect of the present disclosure, in the method according to any one of the first to fourth aspects, the third process includes predicting continuous terrain of the road from an accumulation of the second movement distance and an accumulation of the third movement distance.

With the method according to the fifth aspect, continuous terrain of the road is predicted from an accumulation of the second movement distance and an accumulation of the third movement distance.

In accordance with a sixth aspect of the present disclosure, the method according to any one of the first to fourth aspects further comprises a fifth process of generating first display information to display at least one of the second movement distance, the third movement distance, and the terrain predicted in the third process on a display.

With the method according to the sixth aspect, the first display information generated in the fifth process is used to display at least one of the second movement distance, the third movement distance, and the terrain of the road predicted in the third process on the display. This allows the user to recognize the second movement distance, the third movement distance, and the terrain of the road predicted in the third process.

In accordance with a seventh aspect of the present disclosure, in the method according to the sixth aspect, the third process includes predicting continuous terrain of the road from an accumulation of the second movement distance and an accumulation of the third movement distance.

With the method according to the seventh aspect, continuous terrain of the road is predicted from an accumulation of the second movement distance and an accumulation of the third movement distance.

In accordance with an eighth aspect of the present disclosure, in the method according to the seventh aspect, the first display information includes information for displaying the continuous terrain of the road with a first graphic on the display.

With the method according to the eighth aspect, the continuous terrain of the road is displayed with the first graphic on the display. This allows the user to visually recognize the continuous terrain of the road.

In accordance with a ninth aspect of the present disclosure, the method according to any one of the first to eighth aspects further comprises a sixth process of predicting curving of the road from a roll angle of the human-powered vehicle.

With the method according to the ninth aspect, curving of the road is predicted from the roll angle of the human-powered vehicle. Thus, curving of a traveling route is appropriately detected.

In accordance with a tenth aspect of the present disclosure, the method according to the ninth aspect further comprises a seventh process of generating information related to a traveling route including the terrain predicted in the third process and the curving predicted in the sixth process from the terrain predicted in the third process and the curving predicted in the sixth process.

With the method according to the tenth aspect, information related to the traveling route including the predicted terrain of the road and the predicted curving of the road is generated. Thus, the user readily recognizes the predicted terrain of the road and the predicted curving of the road in association with each other.

In accordance with an eleventh aspect of the present disclosure, the method according to any one of the first to third aspects further comprises a sixth process of predicting curving of the road from a roll angle of the human-powered vehicle. The third process includes predicting continuous terrain of the road from an accumulation of the second movement distance, an accumulation of the third movement distance, and an accumulation of the curving.

With the method according to the eleventh aspect, the continuous terrain of the road is predicted from an accumulation of the second movement distance, an accumulation of the third movement distance, and an accumulation of the curving of the road.

In accordance with a twelfth aspect of the present disclosure, the method according to the eleventh aspect further comprises an eighth process of generating second display information to display the continuous terrain of the road on a display.

With the method according to the twelfth aspect, the second display information generated in the eighth process is used to display the continuous terrain of the road predicted in the third process on the display. This allows the user to recognize the continuous terrain of the road.

In accordance with a thirteenth aspect of the present disclosure, in the method according to the twelfth aspect, the second display information includes displaying the continuous terrain of the road with a second graphic on the display.

With the method according to the thirteenth aspect, the continuous terrain of the road is displayed with the second graphic on the display. This allows the user to visually recognize the continuous terrain of the road.

In accordance with a fourteenth aspect of the present disclosure, in the method according to the thirteenth aspect, the second display information includes information for displaying the second graphic together with a map on the display.

With the method according to the fourteenth aspect, the second graphic is displayed with the map. This allows the user to readily recognize the road on which the human-powered vehicle is traveling.

In accordance with a fifteenth aspect of the present disclosure, the method according to any one of the ninth to fourteenth aspects further comprises a ninth process of storing at least one of the second movement distance, the third movement distance, the terrain predicted in the third process, and the curving predicted in the sixth process in the storage.

With the method according to the fifteenth aspect, at least one of the second movement distance, the third movement distance, the terrain of the road of the road predicted in the third process, and the curving predicted in the sixth process is stored in the storage. This allows the user to recognize at least one of the second movement distance, the third movement distance, the terrain of the road predicted in the third process, and the curving of the road predicted in the sixth process.

In accordance with a sixteenth aspect of the present disclosure, in the method according to any one of the first to fifteenth aspects, the third process includes a tenth process of smoothing the terrain predicted from the second movement distance and the third movement distance in a case where a changing amount of the predicted terrain is greater than or equal to a predetermined changing amount.

With the method according to the sixteenth aspect, the predicted terrain is smoothed in accordance with the changing amount of the predicted terrain.

In accordance with a seventeenth aspect of the present disclosure, in the method according to the sixteenth aspect, the third process includes using straight lines to express the terrain predicted from the second movement distance and the third movement distance. The tenth process includes smoothing the predicted terrain with an envelope related to the straight lines in a case where an angle formed by two of the straight lines is greater than or equal to a predetermined angle.

With the method according to the seventeenth aspect, the predicted terrain is smoothed using an envelope related to straight lines in accordance with an angle formed by two of the straight lines.

In accordance with an eighteenth aspect of the present disclosure, in the method according to any one of the first to seventeenth aspects, the second process includes obtaining the pitch angle from a pitch angle detector provided on a wheel axle of the human-powered vehicle.

With the method according to the eighteenth aspect, the terrain of the road is appropriately predicted from a pitch angle detected by the pitch angle detector provided on the wheel axle.

In accordance with a nineteenth aspect of the present disclosure, in the method according to the eighteenth aspect, the third process includes predicting the terrain from the second movement distance, the third movement distance, and whether the wheel of the human-powered vehicle is in contact with the road.

With the method according to the nineteenth aspect, the terrain of the road is predicted from the second movement distance, the third movement distance, and whether the wheel of the human-powered vehicle is in contact with the road.

A control device in accordance with a twentieth aspect of the present disclosure is for a human-powered vehicle. The control device comprises an electronic controller provided on the human-powered vehicle. The electronic controller is configured to perform the method according to any one of the first to nineteenth aspects.

With the control device according to the twentieth aspect, the terrain of the road is appropriately detected from the first movement distance, the second movement distance, and the third movement distance. With the control device according to the twentieth aspect, the electronic controller is provided on the human-powered vehicle and performs the method for controlling the human-powered vehicle. Thus, the terrain of the road of the human-powered vehicle is predicted. Thus, the control device improves usability.

A control device in accordance with a twenty-first aspect of the present disclosure is for a human-powered vehicle. The control device comprises an electronic controller provided on the human-powered vehicle. The electronic controller is configured to perform the method according to any one of the first to seventeenth aspects. The electronic controller is configured to obtain a detection result from a pitch angle detector provided on the human-powered vehicle to detect the pitch angle. The pitch angle detector includes at least one of an acceleration sensor and an inclination sensor.

With the control device according to the twenty-first aspect, the terrain of the road is detected from the first movement distance, the second movement distance, and the third movement distance. With the control device according to the twenty-first aspect, the electronic controller appropriately predicts the terrain of the road from a pitch angle detected by the pitch angle detector including at least one of the acceleration sensor and the inclination sensor.

A control device in accordance with a twenty-second aspect of the present disclosure is for a human-powered vehicle. The control device comprises an electronic external controller provided outside the human-powered vehicle. The external controller is configured to perform the method according to any one of the first to nineteenth aspects.

With the control device according to the twenty-second aspect, the electronic external controller appropriately predicts the terrain of the road from the first movement distance, the second movement distance calculated from the pitch angle of the human-powered vehicle, and the third movement distance. With the control device according to the twenty-second aspect, the electronic external controller performs the method for controlling the human-powered vehicle. This avoids an increase in the size of a calculation device provided on the human-powered vehicle.

The method for controlling a human-powered vehicle and the control device for a human-powered vehicle according to the present disclosure appropriately predict the terrain of the road on which the human-powered vehicle is traveling.

BRIEF DESCRIPTION OF THE DRAWINGS

Referring now to the attached drawings which form a part of this original disclosure.

DETAILED DESCRIPTION

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
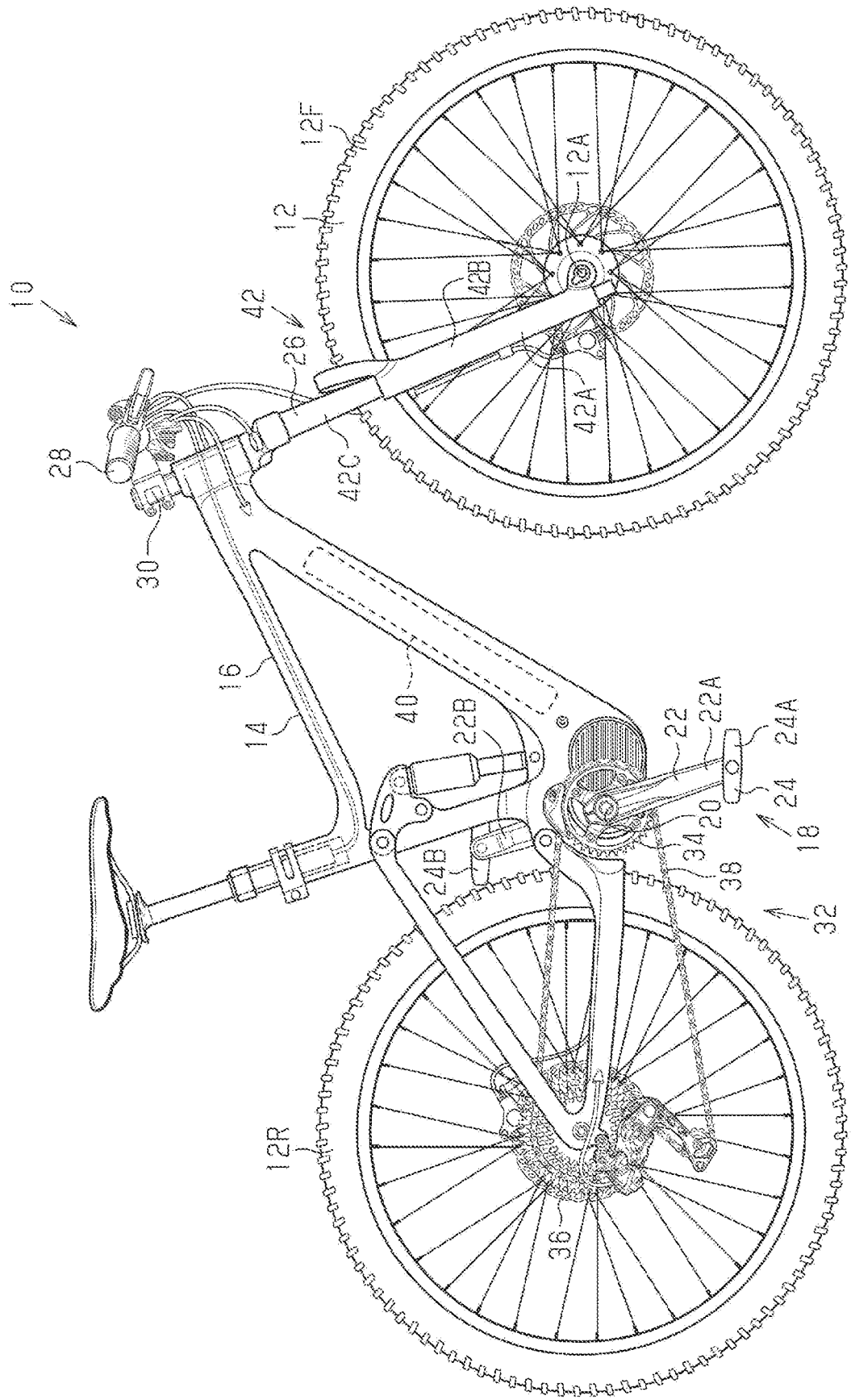
FIG. 1 is a side elevational view of a human-powered vehicle including a human-powered vehicle control device in accordance with the disclosed embodiments.
Figure 2:
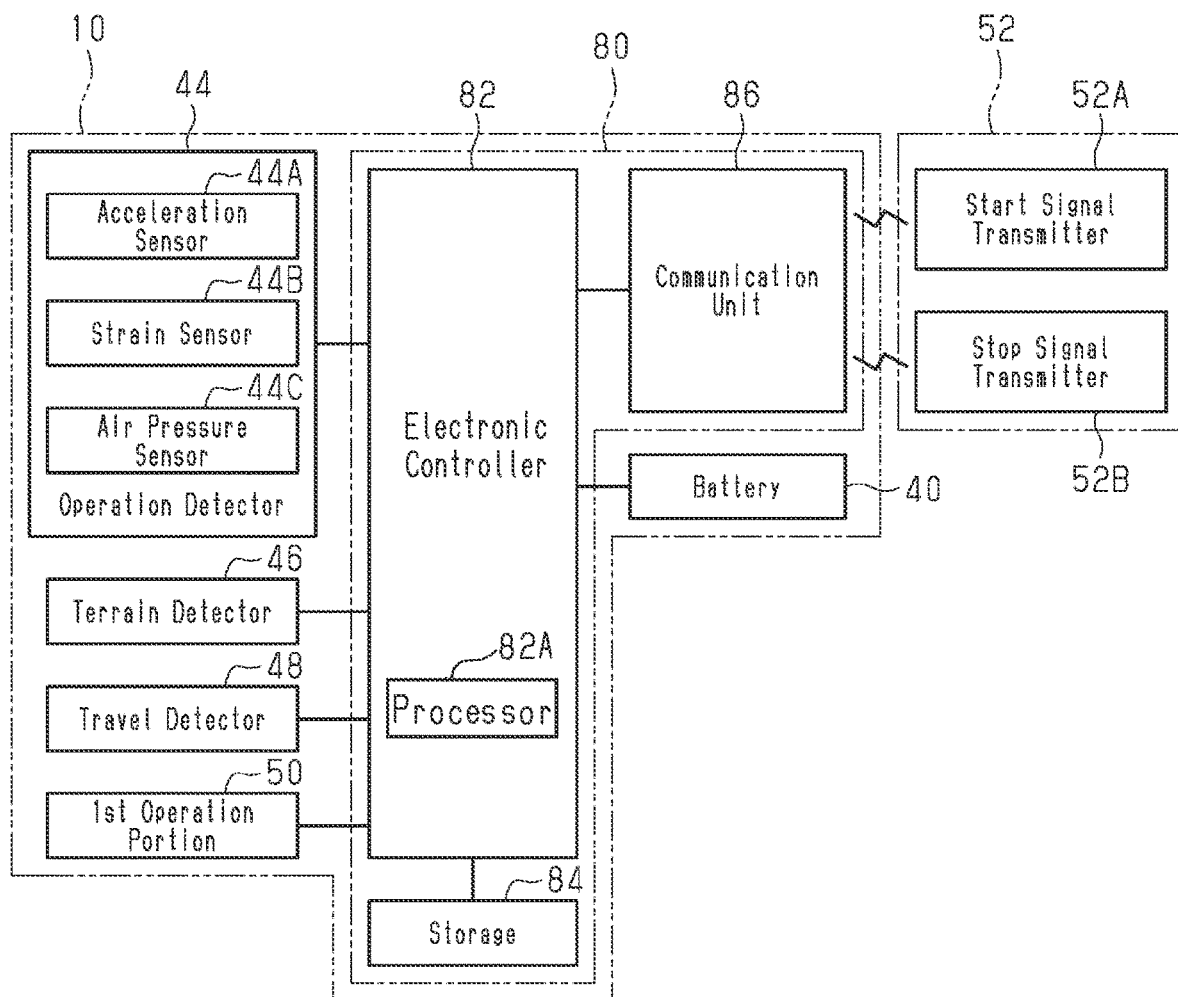
FIG. 2 is a block diagram showing the electrical configuration of the human-powered vehicle shown in FIG. 1 including the human-powered vehicle control device.

As shown in FIGS. 1 and 2, a human-powered vehicle 10 is illustrated that is equipped with a human-powered vehicle control device 80. The human-powered vehicle control device 80 (hereinafter referred to as "the control device 80") will now be described with reference to FIGS. 1 to 5. A human-powered vehicle is a vehicle including at least one wheel and driven by at least a human driving force. Examples of human-powered vehicles include various types of bicycles such as a mountain bike, a road bike, a city bike, a cargo bike, a hand bike, and a recumbent bike. The number of wheels on the human-powered vehicle is not limited. The human-powered vehicle includes, for example, a unicycle and a vehicle including two or more wheels. The human-powered vehicle is not limited to a vehicle configured to be driven only by a human driving force. The human-powered vehicle includes an E-bike that uses a driving force of an electric motor in addition to a human driving force for propulsion. The E-bike includes an electric assist bicycle that assists in propulsion with an electric motor. In the embodiments described below, the human-powered vehicle 10 will be described as a bicycle.

As shown in FIG. 1, the human-powered vehicle 10 includes at least one wheel 12 and a vehicle body 14. A wheel axle 12A is provided on the at least one wheel 12. The at least one wheel 12 includes a front wheel 12F and a rear wheel 12R. Each of the front wheel 12F and the rear wheel 12R includes a wheel axle 12A. The vehicle body 14 includes a frame 16. In an example, a saddle is coupled to the frame 16. In an example, the human-powered vehicle 10 further includes a crank 18 into which a human driving force is input. The crank 18 includes, for example, a crank axle 20 and a crank arm 22. The crank axle 20 is, for example, rotatable relative to the frame 16.

In an example, a pedal 24 is coupled to the crank arm 22. In an example, the crank 18 includes a first crank arm 22A and a second crank arm 22B. In an example, the pedal 24 includes a first pedal 24A and a second pedal 24B. Each of the first crank arm 22A and the second crank arm 22B is provided, for example, on an axial end of the crank axle 20. The first pedal 24A is coupled to the first crank arm 22A. The second pedal 24B is, for example, coupled to the second crank arm 22B.

A fork 26 is joined to the frame 16. The front wheel 12F is attached to the fork 26. A handlebar 28 is coupled to the fork 26 by a stem 30. The rear wheel 12R is supported by the frame 16. In the present embodiment, the rear wheel 12R is coupled to the crank 18 by a drive mechanism 32. The rear wheel 12R is driven in accordance with rotation of the crank axle 20. Any one of the front wheel 12F and the rear wheel 12R can be coupled to the crank 18 by the drive mechanism 32.

The drive mechanism 32 includes a first rotational body 34 coupled to the crank axle 20. In an example, the first rotational body 34 includes a front sprocket. The first rotational body 34 can include a pulley or a bevel gear. The crank axle 20 can be coupled to the front sprocket by a one-way clutch.

The drive mechanism 32 further includes a second rotational body 36 and a transmission member 38. The transmission member 38 is configured to transmit rotational force of the first rotational body 34 to the second rotational body 36. In an example, the transmission member 38 includes a chain. The transmission member 38 can include a belt or a shaft. In an example, the second rotational body 36 includes a rear sprocket. The second rotational body 36 can include a pulley or a bevel gear. In an example, the chain runs on the front sprocket and the rear sprocket. In an example, the second rotational body 36 is coupled to the rear wheel 12R. In an example, the rear wheel 12R is configured to rotate in accordance with rotation of the second rotational body 36.

In an example, the human-powered vehicle 10 further includes a battery 40. In an example, the battery 40 includes one or more battery elements. The battery element includes, for example, a rechargeable battery. In an example, the battery 40 is configured to supply electric power to an electronic controller 82. In an example, the battery 40 is connected to the electronic controller 82 through wired or wireless communication. In an example, the battery 40 is configured to communicate with the electronic controller 82 through power line communication (PLC). The battery 40 can be configured to communicate with the electronic controller 82 through controller area network (CAN) or universal asynchronous receiver/transmitter (UART).

In an example, the human-powered vehicle 10 further includes a suspension 42. In an example, the suspension 42 absorbs an impact applied to the wheel 12. In an example, the suspension 42 includes an electric suspension. The suspension 42 can be a coil suspension, a hydraulic suspension, or an air suspension. In an example, the suspension 42 includes a front suspension 42A. The suspension 42 can include a rear suspension. The suspension 42 includes a first part 42B and a second part 42C that is fitted into the first part 42B and movable relative to the first part 42B. In an example, the first part 42B is coupled to the wheel axle 12A. In an example, the second part 42C is coupled to the stem 30.

As shown in FIG. 2, the human-powered vehicle 10 further includes one or more detectors for detecting one or more operating conditions of the human-powered vehicle 10. The term "detector" as used herein refers to a hardware device or instrument designed to detect the presence or absence of a particular event, object, substance, or a change in its environment, and to emit a signal in response. The term "detector" as used herein do not include a human being. For example, the human-powered vehicle 10 includes at least one of an operation detector 44, a terrain detector 46, and a travel detector 48. In the present embodiment, the human-powered vehicle 10 includes the operation detector 44, the terrain detector 46, and the travel detector 48.

In an example, the operation detector 44 is connected to the electronic controller 82 through wired or wireless communication. The operation detector 44 detects a first parameter correlated to a predetermined operation performed by a rider on the human-powered vehicle 10. In an example, the operation detector 44 detects a first parameter that changes in accordance with a predetermined operation performed by a rider on the human-powered vehicle 10. An example of the predetermined operation is an operation performed by a rider on the vehicle body 14. The predetermined operation includes, for example, an operation of a rider using his/her muscular power to move the vehicle body 14 of the human-powered vehicle 10 relative to the ground. The predetermined operation is related to, for example, force applied to the vehicle body 14 by the rider. The predetermined operation includes, for example, an operation of the rider using his/her muscular power to change at least one of the pitch angle of the vehicle body 14 of the human-powered vehicle 10 and the speed of the human-powered vehicle 10. In an example, the predetermined operation does not include an operation that rotates the handlebar 28. In the present embodiment, the predetermined operation includes, for example, at least one of a first operation in which the rider pushes the handlebar 28 of the human-powered vehicle 10 and a second operation in which the rider pulls the handlebar 28. At least one of the first operation and the second operation is, for example, an operation performed by the rider in accordance with unevenness of the terrain.

In an example, the operation detector 44 is provided on at least one of the frame 16 of the human-powered vehicle 10, the fork 26 of the human-powered vehicle 10, the wheel 12 of the human-powered vehicle 10, and the wheel axle 12A of the human-powered vehicle 10.

In an example, the operation detector 44 includes an acceleration sensor 44A detecting acceleration of the human-powered vehicle 10. In an example, the acceleration sensor 44A is provided on the frame 16. In an example, the acceleration sensor 44A detects a signal corresponding to acceleration of the human-powered vehicle 10. In an example, the acceleration sensor 44A detects a signal corresponding to acceleration in the fore-aft direction of the human-powered vehicle 10. In a case where the operation detector 44 includes the acceleration sensor 44A, the first parameter includes, for example, acceleration. The first parameter includes acceleration in the fore-aft direction of the human-powered vehicle 10. For example, in a case where the first parameter includes acceleration, the acceleration is increased by the first operation and decreased by the second operation. In an example, in the first operation, as the force applied to the vehicle body 14 by the rider increases, the acceleration increases. In an example, in the second operation, as the force applied to the vehicle body 14 by the rider increases, the acceleration decreases. The acceleration can include a negative value.

The acceleration sensor 44A can include at least one of an inertial measurement unit (IMU) and a vehicle speed sensor. In an example, the vehicle speed sensor is configured to detect information related to the speed of the human-powered vehicle 10. In an example, the vehicle speed sensor is configured to detect information related to rotational speed of the wheel 12. In an example, the vehicle speed sensor is configured to detect a magnet provided on at least one of the front wheel 12F and the rear wheel 12R. In an example, the vehicle speed sensor is configured to output a detection signal a predetermined number of times during one rotation of the wheel 12. The predetermined number of times is, for example, one. In an example, the vehicle speed sensor outputs a signal corresponding to rotational speed of the wheel 12. The electronic controller 82 calculates the speed of the human-powered vehicle 10 based on the signal corresponding to the rotational speed of the wheel 12 and information related to the circumferential length of the wheel 12. In an example, the storage 84 stores information related to the circumferential length of the wheel 12. The electronic controller 82 can be configured to differentiate the vehicle speed to obtain information related to acceleration in the fore-aft direction of the human-powered vehicle 10.

In an example, the inertial measurement unit detects three-dimensional inertial motion. The three-dimensional inertial motion includes, for example, translational motion and rotational motion in perpendicular triaxial directions. The inertial measurement unit includes, for example, an acceleration sensor, a vehicle speed sensor, and a gyro sensor. The acceleration sensor of the inertial measurement unit is, for example, configured to detect acceleration in the fore-aft direction, the vertical direction, and the lateral direction.

The operation detector 44 includes a strain sensor 44B. In an example, the strain sensor 44B detects strain of the human-powered vehicle 10. In an example, the strain sensor 44B detects strain of the vehicle body 14. The strain sensor 44B is provided on at least one of the wheel axle 12A, the fork 26, and the frame 16. The strain sensor 44B can be provided on the handlebar 28. In a case where the operation detector 44 includes the strain sensor 44B, the first parameter includes, for example, strain. The strain sensor 44B outputs a signal corresponding to strain of at least one of the fork 26, the wheel axle 12A, the frame 16, and the handlebar 28. In an example, in a case where the first parameter includes strain of the human-powered vehicle 10 and one of the first operation and the second operation is performed, strain of the human-powered vehicle 10 is increased.

The strain sensor 44B can include a first strain sensor that detects strain corresponding to the first operation and a second strain sensor that detects strain corresponding to the second operation. In a case where the second operation is performed, the front wheel 12F is separated from the ground or force applied to the ground from the front wheel 12F is decreased. In a case where force applied to the ground from the front wheel 12F decreases and a bump of the ground is in contact with the front wheel 12F, the human-powered vehicle 10 is strained by force applied from the ground. The strain corresponding to the second operation includes at least one of strain of the human-powered vehicle 10 produced by force of the rider applied to the human-powered vehicle 10 in the second operation and strain of the human-powered vehicle 10 produced by contact with the ground in the second operation.

In an example, in a state where the front wheel 12F is in contact with the ground, in a case where the first operation is performed, at least one of the frame 16, the fork 26, the wheel axle 12A, and the handlebar 28 is strained by force produced in a direction from the portion to which rider applies force toward the front wheel 12F. In an example, in the first operation, as force applied to the vehicle body 14 by the rider increases, the strain of the vehicle body 14 increases. In an example, in the first operation, as force applied to the vehicle body 14 by the rider increases, the strain of the vehicle body 14 produced by contact with the ground increases. In an example, in a case where the second operation is performed, at least one of the frame 16, the fork 26, and the handlebar 28 is strained by pulling force toward the rider between the portion to which the rider applies force and the front wheel 12F. In an example, in the second operation, as force applied to the vehicle body 14 by the rider increases, the strain of the vehicle body 14 increases. In an example, in the second operation, as force applied to the vehicle body 14 by the rider increases, the strain of the vehicle body 14 produced by contact with the ground decreases. In an example, the electronic controller 82 can be configured to detect at least one of the first operation and the second operation based on at least one of the terrain information of the road and travel data of another person including information related to strain of the human-powered vehicle 10.

In a case where the strain sensor 44B is provided on the wheel axle 12A, the strain sensor 44B is configured to detect, for example, at least one of tensile strain of the wheel axle 12A and compressive strain of the wheel axle 12A. The fork 26 supports the right end and the left end of the wheel axle 12A. In a case where the strain sensor 44B is provided on a lower surface of the wheel axle 12A, as strain of the wheel axle 12A corresponding to the first operation increases, the wheel axle 12A is strained so that the right end and the left end of the wheel axle 12A are forced downward. Thus, the strain sensor 44B detects an increase in compressive strain. In a case where the strain sensor 44B is provided on a lower surface of the wheel axle 12A, as strain of the wheel axle 12A corresponding to the second operation increases, the wheel axle 12A is strained so that the right end and the left end of the wheel axle 12A are forced upward. Thus, the strain sensor 44B detects an increase in tensile strain. In a case where the strain sensor 44B is provided on an upper surface of the wheel axle 12A, as strain of the wheel axle 12A corresponding to the first operation increases, the strain sensor 44B detects an increase in tensile strain. In a case where the strain sensor 44B is provided on an upper surface of the wheel axle 12A, as strain of the wheel axle 12A corresponding to the second operation increases, the strain sensor 44B detects an increase in compressive strain.

In an example, the operation detector 44 includes an air pressure sensor 44C that detects air pressure of the wheel 12. In an example, the air pressure sensor 44C is provided on the wheel 12. In a case where the operation detector 44 includes the air pressure sensor 44C, the first parameter includes, for example, air pressure of the wheel 12. In an example, the air pressure sensor 44C outputs a signal corresponding to the air pressure of the wheel 12. In an example, the first parameter includes air pressure of at least one of the front wheel 12F and the rear wheel 12R. In an example, in a case where the first parameter includes air pressure of the front wheel 12F, the air pressure of the front wheel 12F is increased by the first operation and decreased by the second operation. In an example, in a case where the first parameter includes air pressure of the rear wheel 12R, the air pressure of the rear wheel 12R is decreased by the first operation and increased by the second operation. The electronic controller 82 can be configured to calculate a load distribution to the front wheel 12F and the rear wheel 12R based on a detection value of the air pressure sensor 44C provided on at least one of the front wheel 12F and the rear wheel 12R.

The operation detector 44 can include at least one of an inclination sensor and a speed sensor. The inclination sensor includes, for example, a gyro sensor.

In an example, the terrain detector 46 is connected to the electronic controller 82 through wired or wireless communication. The terrain detector 46 detects a second parameter correlated to terrain of a road on which the human-powered vehicle 10 is traveling. In an example, the terrain detector 46 detects a second parameter that changes in accordance with terrain of the road on which the human-powered vehicle 10 is traveling. The terrain detector 46 includes, for example, at least one of a first acceleration sensor 46A and a second acceleration sensor 46B. In an example, the first acceleration sensor 46A detects acceleration in the vertical direction of the human-powered vehicle 10. In an example, the second acceleration sensor 46B detects acceleration in the lateral direction of the human-powered vehicle 10.

In an example, the first acceleration sensor 46A detects a pitch angle of the human-powered vehicle 10. The first acceleration sensor 46A can include an inertial measurement unit. In a case where the operation detector 44 includes an inertial measurement unit, the inertial measurement unit of the first acceleration sensor 46A can be formed integrally with the inertial measurement unit of the operation detector 44. In an example, the second acceleration sensor 46B detects a roll angle of the human-powered vehicle 10. The second acceleration sensor 46B can detect a yaw angle instead of or in addition to a roll angle. The second acceleration sensor 46B can include an inertial measurement unit. In a case where the operation detector 44 includes an inertial measurement unit, the inertial measurement unit of the second acceleration sensor 46B can be formed integrally with the inertial measurement unit of the operation detector 44.

In a case where the terrain detector 46 includes the first acceleration sensor 46A, the second parameter includes acceleration in the vertical direction of the human-powered vehicle 10. The acceleration in the vertical direction of the human-powered vehicle 10 changes, for example, in accordance with unevenness of the terrain of the road. In a case where the terrain detector 46 includes the second acceleration sensor 46B, the second parameter includes acceleration in the lateral direction of the human-powered vehicle 10. The acceleration in the lateral direction of the human-powered vehicle 10 changes, for example, in accordance with curving of the road.

In a case where the human-powered vehicle 10 includes the suspension 42, the terrain detector 46 is, for example, provided on at least one of the wheel axle 12A of the human-powered vehicle 10 and a portion of the human-powered vehicle 10 closer to the wheel axle 12A than a moving portion of the suspension 42. In a case where the suspension 42 includes the front suspension 42A and the second part 42C is coupled to the stem 30, the moving portion of the suspension 42 includes, for example, the second part 42C. In a case where the suspension 42 includes the front suspension 42A, the portion of the human-powered vehicle 10 closer to the wheel axle 12A of the human-powered vehicle 10 than the moving portion of the suspension 42 can include the first part 42B of the suspension 42. In a case where the suspension 42 includes a rear suspension, the portion of the human-powered vehicle 10 closer to the wheel axle 12A of the human-powered vehicle 10 than the moving portion of the suspension 42 includes a portion of the human-powered vehicle 10 closer to the ground than the rear suspension. In a case where the human-powered vehicle 10 does not include the front suspension 42A, the terrain detector 46 can be provided on the fork 26.

In an example, the travel detector 48 is connected to the electronic controller 82 through wired or wireless communication. The travel detector 48 detects at least one of a traveling state and a traveling environment of the human-powered vehicle 10. The travel detector 48 includes, for example, a sensor configured to detect a parameter related to travel of the human-powered vehicle 10. The parameter related to travel of the human-powered vehicle 10 includes, for example, at least one of gradient of the road on which the human-powered vehicle 10 is traveling, an impact applied to the human-powered vehicle 10, speed of the human-powered vehicle 10, acceleration of the human-powered vehicle 10, and a parameter related to gradient of the road on which the human-powered vehicle 10 is traveling, a parameter related to an impact applied to the human-powered vehicle 10, a parameter related to speed of the human-powered vehicle 10, and a parameter related to acceleration of the human-powered vehicle 10. The impact applied to the human-powered vehicle 10 includes, for example, an impact applied to the suspension 42. The impact applied to the human-powered vehicle 10 includes, for example, a parameter related to an impact applied to the suspension 42.

The travel detector 48 includes, for example, at least one of an inclination sensor, a vehicle speed sensor, and an acceleration sensor. The inclination sensor of the travel detector 48 is configured to detect information related to gradient of the road on which the human-powered vehicle 10 is traveling. The inclination sensor includes, for example, a gyro sensor. The inclination sensor detects, for example, a pitch angle of the human-powered vehicle 10. The vehicle speed sensor of the travel detector 48 can be configured in the same manner as a vehicle speed sensor included in the first acceleration sensor 46A. The acceleration sensor of the travel detector 48 is configured to output a signal corresponding to acceleration in the fore-aft direction of the human-powered vehicle 10. The acceleration sensor of the travel detector 48 can be configured in the same manner as the first acceleration sensor 46A.

The control device 80 for a human-powered vehicle includes the electronic controller 82 and the storage 84. The electronic controller 82 includes, for example, one or more processors 82A that executes a predetermined control program. The processor 82A includes, for example, a central processing unit (CPU) or a micro processing unit (MPU). The electronic controller 82 can include one or more microcomputers. The electronic controller 82 can include multiple processors 82A arranged at separate locations. The electronic controller 82 is formed of one or more semiconductor chips that are mounted on a circuit board. Thus, the term "electronic controller" as used herein refers to hardware that executes a software program, and does not include a human being.

The storage 84 stores, for example, control programs and information used for various control processes. The storage 84 stores, for example, a program related to the control device 80 for a human-powered vehicle. The storage 84 is any computer storage device or any non-transitory computer-readable medium with the sole exception of a transitory, propagating signal. The storage 84 includes, for example, at least one of a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM). The storage 84 is, for example, configured to perform wired or wireless communication with the electronic controller 82.

The storage 84 is configured to continuously store predetermined information including the first parameter and the second parameter. The continuous storing refers to, for example, continuation of storing for a predetermined storing period. The predetermined storing period is determined based on the resolution of a sensor configured to detect information on a subject, the calculation cycle of the electronic controller 82, the performance of the storage 84, and the like.

In an example, the electronic controller 82 is configured to start continuously storing predetermined information in the storage 84 in a case where a start signal is received. In an example, the electronic controller 82 is configured to stop the storage 84 from continuously storing the predetermined information in a case where a stop signal is received. In an example, the start signal and the stop signal are transmitted from at least one of an operation device provided on the human-powered vehicle 10 and an external device 52.

In an example, the control device 80 further includes a communication unit 86. The term "communication unit" as used herein refers to a device or devices, and does not include a human being. The communication unit 86 can also be referred to as a communicator. The communication unit 86 is, for example, configured to perform wired or wireless communication with the external device 52. The communication unit 86 is configured to receive a signal transmitted from the external device 52. In an example, the external device 52 is used for a race of the human-powered vehicle 10. In an example, the external device 52 includes at least one of the start signal transmitter 52A and the stop signal transmitter 52B. At least one of the start signal transmitter 52A and the stop signal transmitter 52B is, for example, provided on course tape. In an example, the start signal transmitter 52A is provided on a course tape located at the start point of the course. In an example, the start signal transmitter 52A is configured to transmit a start signal to the communication unit 86 to start storing predetermined information in the storage 84. In an example, the stop signal transmitter 52B is provided on a course tape located at the finish point of the course. The stop signal transmitter 52B is configured to transmit the stop signal to the communication unit 86 to stop the storage 84 from storing the predetermined information. The external device 52 includes, for example, a server. In an example, the server is configured to communicate with at least one of the start signal transmitter 52A and the stop signal transmitter 52B.

The start signal transmitter 52A can be provided on a tape switch provided on the course to resume recording. In a case where the start signal transmitter 52A is provided on a tape switch provided on the course to resume recording, the start signal transmitter 52A transmits the start signal to the communication unit 86 to start storing predetermined information in the storage 84, for example, in a case where the human-powered vehicle 10 travels over the tape switch to resume recording. The start signal transmitter 52A can be configured to transmit the start signal to an integrated circuit (IC) chip assigned with a unique ID. The IC chip is provided on, for example, the human-powered vehicle 10 or the rider. The IC chip can be included in the communication unit 86. In a case where the start signal transmitter 52A is configured to transmit the start signal to the IC chip, for example, at least one start signal transmitter 52A is provided on the course.

In a state where the storage 84 is continuously storing predetermined information, the electronic controller 82 is configured to stop the storage 84 from continuously storing the predetermined information in accordance with an output from the travel detector 48. In a state where the storage 84 is continuously storing the predetermined information, the electronic controller 82 is configured to temporarily stop the storage 84 from continuously storing the predetermined information in accordance with an output from the travel detector 48.

In an example, the travel detector 48 is configured to detect at least one of gradient of the road and a pitch angle of the human-powered vehicle 10. In an example, the electronic controller 82 is configured to stop the storage 84 from continuously storing the predetermined information in at least one of a case where the gradient of the road corresponds to an uphill and is greater than or equal to a first angle, a case where the gradient of the road corresponds to a downhill and is greater than or equal to a second angle, and a case where the pitch angle of the human-powered vehicle 10 is greater than or equal to a third angle.

The first angle, the second angle, and the third angle are expressed as an absolute value as the reference angle is zero degrees. The reference angle corresponds to, for example, an angle of a flat road. The reference angle is, for example, zero degrees. The case where the gradient corresponds to an uphill and is greater than or equal to the first angle includes, for example, an uphill having the first angle or greater. The case where the gradient corresponds to a downhill and is greater than or equal to the second angle includes, for example, a downhill having the second angle or greater. The case where the pitch angle of the human-powered vehicle 10 is greater than or equal to the third angle includes, for example, both an uphill having the third angle or greater and a downhill having the third angle or greater.

The human-powered vehicle 10 further includes, for example, a first operation portion 50. In an example, the first operation portion 50 is configured to be operable by the rider. In an example, the first operation portion 50 is provided on the handlebar 28. In an example, the first operation portion 50 is provided on at least one of a cycle computer and a smartphone. In an example, the first operation portion 50 includes at least one of a button, a dial, and a lever. In an example, the first operation portion 50 is configured to transmit the start signal to the electronic controller 82 for starting to store predetermined information in the storage 84. In an example, in a case where the first operation portion 50 is operated, the electronic controller 82 is configured to start to store predetermined information in the storage 84. The first operation portion 50 can be configured to transmit the stop signal to the electronic controller 82 for stopping the storage 84 from storing predetermined information. In an example, in a case where the first operation portion 50 is operated, the electronic controller 82 can be configured to stop the storage 84 from storing predetermined information.

In an example, in a state where the storage 84 stops storing the predetermined information, the electronic controller 82 is configured to have the storage 84 start storing the predetermined information again in a case where the first operation portion 50 operable by a rider is operated. In an example, in a state where the storage 84 stops storing the predetermined information, the electronic controller 82 is configured to have the storage 84 start storing the predetermined information again in a case where the start signal is received from the first operation portion 50. In a state where the storage 84 has started storing the predetermined information, the electronic controller 82 can be configured to stop the storage 84 from storing the predetermined information in a case where the first operation portion 50 is operated.

A process for controlling the storage 84 with the electronic controller 82 in the first embodiment will now be described with reference to FIGS. 3 and 4. For example, in a case where electric power is supplied to the electronic controller 82, the electronic controller 82 starts the process and proceeds to step S11 of the flowchart shown in FIG. 3. In a case where the flowcharts shown in FIGS. 3 and 4 end, the electronic controller 82 repeats the process from step S11 after a predetermined interval, for example, until the supply of electric power stops.

In step S11, the electronic controller 82 determines whether the start signal is received. In an example, in a case where the communication unit 86 receives the start signal, the electronic controller 82 determines that the start signal is received. In an example, in a case where the communication unit 86 does not receive the start signal, the electronic controller 82 determines that the start signal is not received. In a case where the start signal is received, the electronic controller 82 proceeds to step S12. In a case where the start signal is not received, the electronic controller 82 ends the process. In step S12, the electronic controller 82 starts storing predetermined information in the storage 84 and then proceeds to step S13.

In step S13, the electronic controller 82 determines whether the gradient corresponds to an uphill and is greater than or equal to the first angle. In an example, in a case where the gradient is not uphill, the electronic controller 82 makes a negative determination on the gradient corresponding to an uphill and being greater than or equal to the first angle. In an example, in a case where the gradient corresponds to an uphill and is less than the first angle, the electronic controller 82 makes a negative determination on the gradient corresponding to an uphill and being greater than or equal to the first angle. In a case where the gradient corresponds to an uphill and is greater than or equal to the first angle, the electronic controller 82 proceeds to step S14.

In step S13, in a case where the gradient does not correspond to an uphill or is not greater than or equal to the first angle, the electronic controller 82 proceeds to step S17. In step S17, the electronic controller 82 determines whether the gradient corresponds to a downhill and is greater than or equal to the second angle. In an example, in a case where the gradient is not downhill, the electronic controller 82 makes a negative determination on the gradient corresponding to a downhill and being greater than or equal to the second angle. In an example, in a case where the gradient corresponds to a downhill and is less than the second angle, the electronic controller 82 makes a negative determination on the gradient corresponding to a downhill and being greater than or equal to the second angle. In a case where the gradient corresponds to a downhill and is greater than or equal to the second angle, the electronic controller 82 proceeds to step S14. In a case where the gradient does not correspond to a downhill or is not greater than or equal to the second angle, the electronic controller 82 proceeds to step S18.

In step S18, the electronic controller 82 determines whether the pitch angle of the human-powered vehicle 10 is greater than or equal to the third angle. For example, in a case where the road is uphill and the pitch angle is greater than or equal to the third angle and a case where the road is downhill and the pitch angle is greater than or equal to the third angle, the electronic controller 82 determines that the pitch angle of the human-powered vehicle 10 is greater than or equal to the third angle. In a case where the road is level, a case where the road is uphill and the pitch angle is less than the third angle, and a case where the road is downhill and the pitch angle is less than the third angle, the electronic controller 82 determines that the pitch angle of the human-powered vehicle 10 is not greater than or equal to the third angle. In a case where the pitch angle of the human-powered vehicle 10 is greater than or equal to the third angle, the electronic controller 82 proceeds to step S14. In step S18, in a case where the pitch angle of the human-powered vehicle 10 is not greater than or equal to the third angle, the electronic controller 82 proceeds to step S19.

In step S14, the electronic controller 82 stops the storage 84 from continuously storing the predetermined information and then proceeds to step S15. In step S15, the electronic controller 82 determines whether the first operation portion 50 is operated. In a case where the first operation portion 50 is not operated, the process ends. In step S15, in a case where the first operation portion 50 is operated, the electronic controller 82 proceeds to step S16. In step S16, the electronic controller 82 has the storage 84 start storing the predetermined information again and then proceeds to step S19.

In step S19, the electronic controller 82 determines whether the stop signal is received. In a case where the stop signal is received, the electronic controller 82 proceeds to step S20. In step S20, the electronic controller 82 stops the storage 84 from storing the predetermined information and then ends the process. In step S19, in a case where the stop signal is not received, the electronic controller 82 proceeds to step S21. In step S21, the electronic controller 82 determines whether a first predetermined period has elapsed. In an example, in a case where a period starting from receipt of the start signal is greater than or equal to the first predetermined period, the electronic controller 82 determines that the first predetermined period has elapsed. The first predetermined period is, for example, a period determined in advance. The first predetermined period is, for example, longer than a period in which the human-powered vehicle 10 finishes traveling on the course. In a case where the first predetermined period has ended, the electronic controller 82 proceeds to step S20. In a case where the first predetermined period has not ended, the electronic controller 82 repeats the steps after step S12. In the first embodiment, in a case where the first predetermined period has not elapsed, the electronic controller 82 proceeds to step S13 and repeats the process from step S13.

In step S15, the electronic controller 82 can be configured to determine whether the start signal is received instead of determining whether the first operation portion 50 is operated. In an example, in a case where the communication unit 86 receives the start signal, the electronic controller 82 determines that the start signal is received. In an example, in a case where the communication unit 86 does not receive the start signal, the electronic controller 82 determines that the start signal is not received. In a case where the human-powered vehicle 10 includes an IC chip assigned with a unique ID, the electronic controller 82 can be configured to determine that the start signal is received in a case where the IC chip has received the start signal and to determine that the start signal is not received in a case where the IC chip does not receive the start signal. In a case where the electronic controller 82 is configured to determine whether the start signal is received in step S15 and the start signal is received, the electronic controller 82 proceeds to step S16. In a case where the electronic controller 82 is configured to determine whether the start signal is received in step S15 and the start signal is not received, the electronic controller 82 ends the process.

In an example, the electronic controller 82 is configured to generate first information associating the predetermined operation and the terrain from the predetermined information. In an example, the electronic controller 82 is configured to generate the first information in a case where generation of the first information is requested. In an example, in a case where a signal related to a request to generate the first information is transmitted from an information processing device, the electronic controller 82 is configured to determine that generation of the first information is requested. In an example, in a case where a request to generate the first information is transmitted through an operating device provided on the human-powered vehicle 10, the electronic controller 82 can be configured to determine that generation of the first information is requested. The information processing device is configured to perform wireless or wired communication with the electronic controller 82. The information processing device includes, for example, at least one of a personal computer, a smartphone, a tablet computer, and a cycle computer. The electronic controller 82 can be configured to transmit the predetermined information to the information processing device so that the information processing device generates the first information.

In an example, the first information is shown on a display. In an example, the terrain included in the first information is shown by a two-dimensional or three-dimensional graph or image. In an example, the location where the first operation was performed and the location where the second operation was performed are indicated in different colors or by different types of line on the two-dimensional or three-dimensional graph or image.

Figure 5:
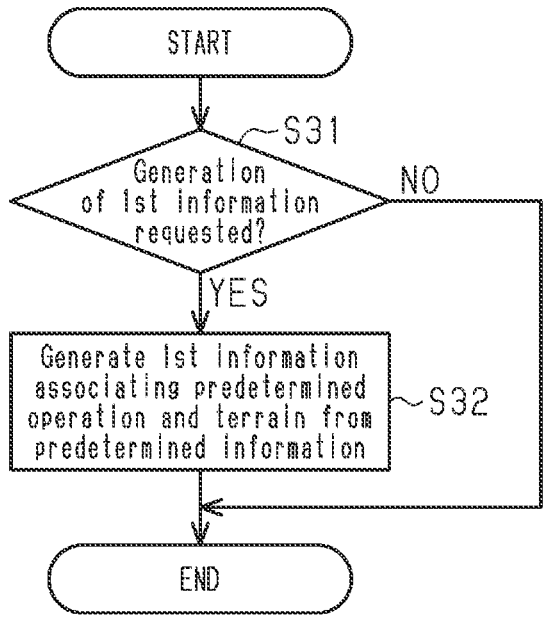
FIG. 5 is a flowchart of a process for generating first information executed by the electronic controller shown in FIG. 2.

A process for generating the first information with the electronic controller 82 will now be described with reference to FIG. 5. For example, in a case where electric power is supplied to the electronic controller 82, the electronic controller 82 starts the process and proceeds to step S31 of the flowchart shown in FIG. 5. In a case where the flowchart shown in FIG. 5 ends, the electronic controller 82 repeats the process from step S31 after a predetermined interval, for example, until the supply of electric power stops.

In step S31, the electronic controller 82 determines whether generation of the first information is requested. In an example, in a case where a signal related to a request to generate the first information is transmitted from the information processing device, the electronic controller 82 determines that generation of the first information is requested. In a case where generation of the first information is requested, the electronic controller 82 proceeds to step S32. In a case where generation of the first information is not requested, the electronic controller 82 ends the process. In step S32, the electronic controller 82 generates first information associating the predetermined operation and the terrain from the predetermined information and then ends the process. In a case where the human-powered vehicle 10 has finished traveling, the electronic controller 82 can be configured to generate the first information. In this case, step S31 is omitted from FIG. 5, and, for example, in a case where electric power is supplied to the electronic controller 82, the electronic controller 82 executes step S32.

For example, in a case where the gradient corresponds to an uphill and is greater than or equal to the first angle, a case where the gradient corresponds to a downhill and is greater than or equal to the second angle, and a case where the pitch angle of the human-powered vehicle 10 is greater than or equal to the third angle, there is a possibility that the vehicle body 14 is in a particular state. The particular state of the vehicle body 14 includes, for example, a state in which the vehicle body 14 jumps and is separated from the road. In a case where the vehicle body 14 is in a particular state, the electronic controller 82 can fail to appropriately predict the terrain. Consequently, the first information is likely to differ from actual information and be inaccurate. In a case where the vehicle body 14 is in a particular state, the electronic controller 82 stops the storage 84 from continuously storing the predetermined information. This limits generation of inaccurate first information.

Changes in the terrain reflect more on behavior of the front wheel 12F than on behavior of the rear wheel 12R. In the present embodiment, the terrain detector 46 is provided on at least one of the wheel axle 12A and a portion of the human-powered vehicle 10 closer to the wheel axle 12A than the moving portion of the front suspension 42A. Thus, the terrain is appropriately detected.

Second Embodiment

A second embodiment of a control device 80 for a human-powered vehicle will now be described with reference to FIGS. 1 to 6. In the human-powered vehicle control device 80 of the second embodiment, the same reference characters are given to those components that are the same as the corresponding components of the first embodiment. Such components will not be described in detail.

In the second embodiment, the travel detector 48 is configured to detect, for example, an impact applied to the human-powered vehicle 10. In an example, in a case where an impact is applied to the human-powered vehicle 10, the electronic controller 82 is configured to stop the storage 84 from continuously storing predetermined information. In an example, in a state where the storage 84 is continuously storing predetermined information, in a case where an impact greater than or equal to a predetermined impact is applied to the human-powered vehicle 10, the electronic controller 82 stops the storage 84 from continuously storing the predetermined information.

The impact applied to the human-powered vehicle 10 includes, for example, an impact applied to the suspension 42. In an example, the travel detector 48 can be configured to detect an impact applied to the suspension 42. In a case where the travel detector 48 is configured to detect an impact applied to the suspension 42, the travel detector 48 is provided, for example, on at least one of the suspension 42 and a member of the human-powered vehicle 10 located in the vicinity of the suspension 42. In a case where the travel detector 48 is provided on the suspension 42, the electronic controller 82 can be configured to detect an impact from damping of the suspension 42. In a case where the travel detector 48 includes at least one of an inclination sensor and an acceleration sensor, the electronic controller 82 can be configured to detect vibration of the human-powered vehicle 10 as the impact applied to the human-powered vehicle 10.

Figure 6:
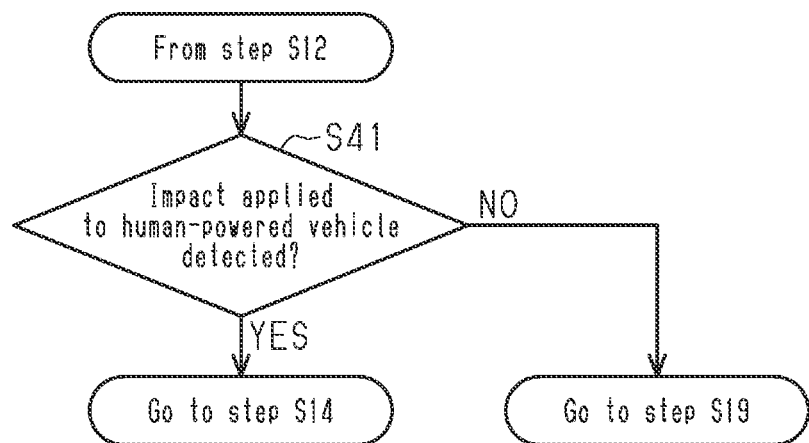
FIG. 6 is a flowchart of a process for controlling storage executed by a second embodiment of an electronic controller.

A process for controlling the storage 84 with the electronic controller 82 in the second embodiment will now be described with reference to FIGS. 3, 4, and 6. For example, in a case where electric power is supplied to the electronic controller 82, the electronic controller 82 starts the process and proceeds to step S11 of the flowchart shown in FIG. 3. In a case where the flowcharts shown in FIGS. 3, 4, and 6 end, the electronic controller 82 repeats the process from step S11 after a predetermined interval, for example, until the supply of electric power stops.

Figure 3:
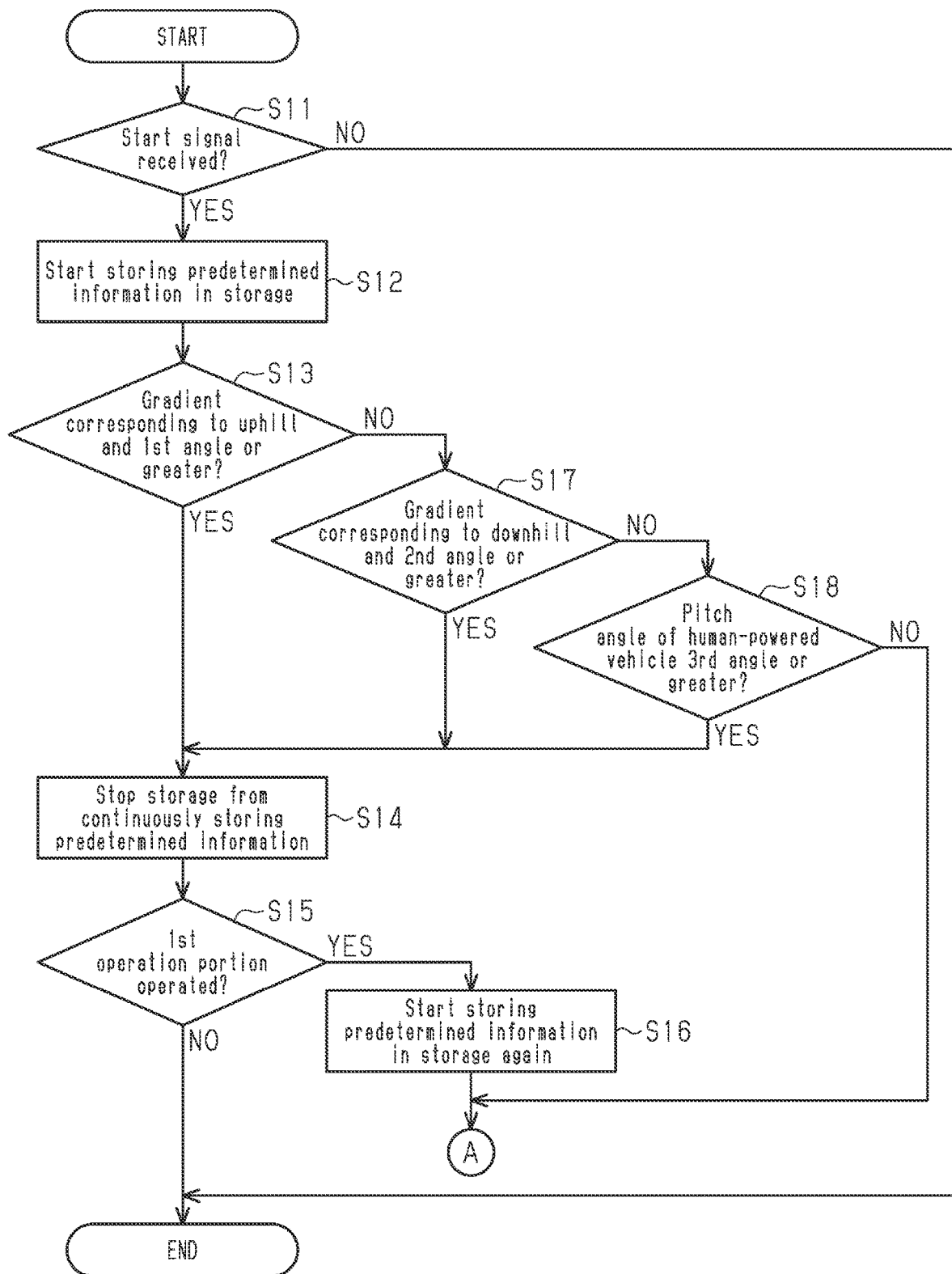
FIG. 3 is a flowchart of a first part of a process for controlling storage executed by an electronic controller shown in FIG. 2.

The electronic controller 82 executes steps S11 and S12 shown in FIG. 3 in the same manner as the first embodiment. After step S12 of FIG. 3, the electronic controller 82 proceeds to step S41 shown in FIG. 6.

In step S41, the electronic controller 82 determines whether an impact applied to the human-powered vehicle 10 is detected. In a case where an impact applied to the human-powered vehicle 10 is detected, the electronic controller 82 proceeds to step S14. In step S41, in a case where an impact applied to the human-powered vehicle 10 is not detected, the electronic controller 82 proceeds to step S19. In step S41, the electronic controller 82 can determine whether an impact applied to the suspension 42 is detected. In a case where the electronic controller 82 is configured to determine whether an impact applied to the suspension 42 is detected in step S41 and detects an impact applied to the suspension 42, the electronic controller proceeds to step S14. In a case where the electronic controller 82 is configured to determine whether an impact applied to the suspension 42 is detected in step S41 and does not detect an impact applied to the suspension 42, the electronic controller proceeds to step S19.

Figure 4:
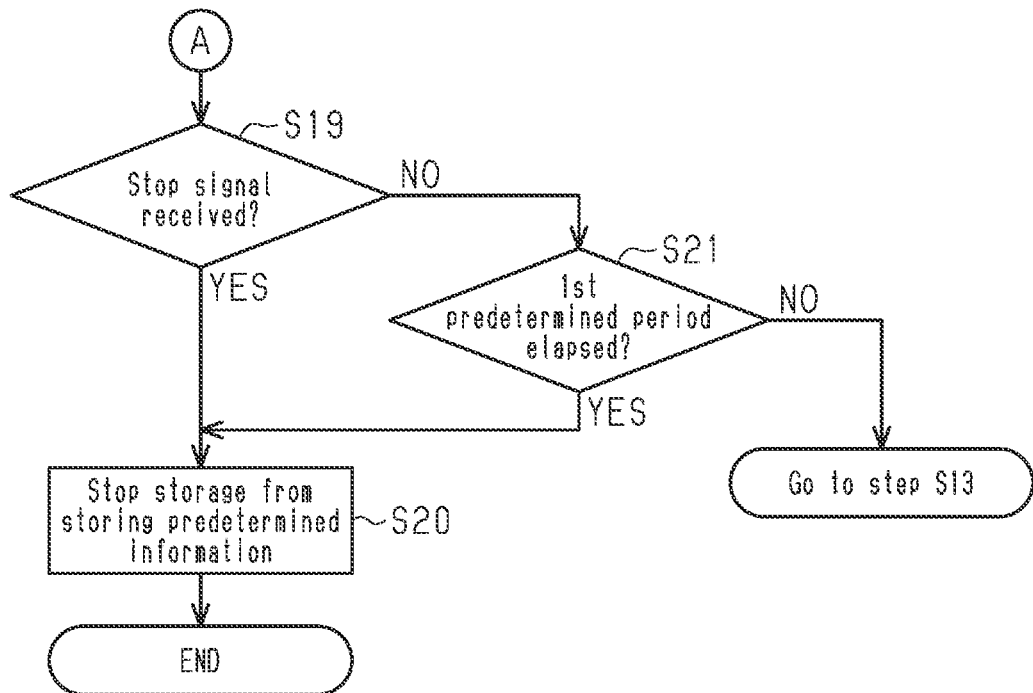
FIG. 4 is a flowchart of a second part of the process for controlling the storage executed by the electronic controller shown in FIG. 2.

The electronic controller 82 executes steps S19 to S21 shown in FIG. 4 in the same manner as the first embodiment. In step S21, in a case where the first predetermined period has not elapsed, the electronic controller 82 proceeds to step S41 and repeats the process from step S41.

For example, in a case where a large impact is applied to the human-powered vehicle 10, there is a possibility that the electronic controller 82 inaccurately predicts the terrain. Consequently, the first information is likely to differ from actual information and be inaccurate. In this regard, in a case where a large impact is applied to the human-powered vehicle 10, the electronic controller 82 stops the storage 84 from continuously storing the predetermined information. This limits generation of inaccurate first information.

Third Embodiment

A third embodiment of a control device 80 for a human-powered vehicle will now be described with reference to FIGS. 1 to 5 and 7. In the human-powered vehicle control device 80 of the third embodiment, the same reference characters are given to those components that are the same as the corresponding components of the first embodiment. Such components will not be described in detail.

In the third embodiment, the travel detector 48 is configured to detect, for example, at least one of speed of the human-powered vehicle 10 and acceleration of the human-powered vehicle 10. In a case where the travel detector 48 is configured to detect the vehicle speed, the travel detector 48 includes a vehicle speed sensor. In a case where the travel detector 48 is configured to detect the acceleration, the travel detector 48 includes an acceleration sensor. In a case where the travel detector 48 includes a vehicle speed sensor, the electronic controller 82 can be configured to differentiate the vehicle speed to obtain information related to acceleration in a direction in which the human-powered vehicle 10 travels forward.

In an example, in at least one of a case where the vehicle speed is greater than or equal to a first speed and a case where the acceleration is greater than or equal to a first acceleration, the electronic controller 82 is configured to stop the storage 84 from continuously storing predetermined information.

Figure 7:
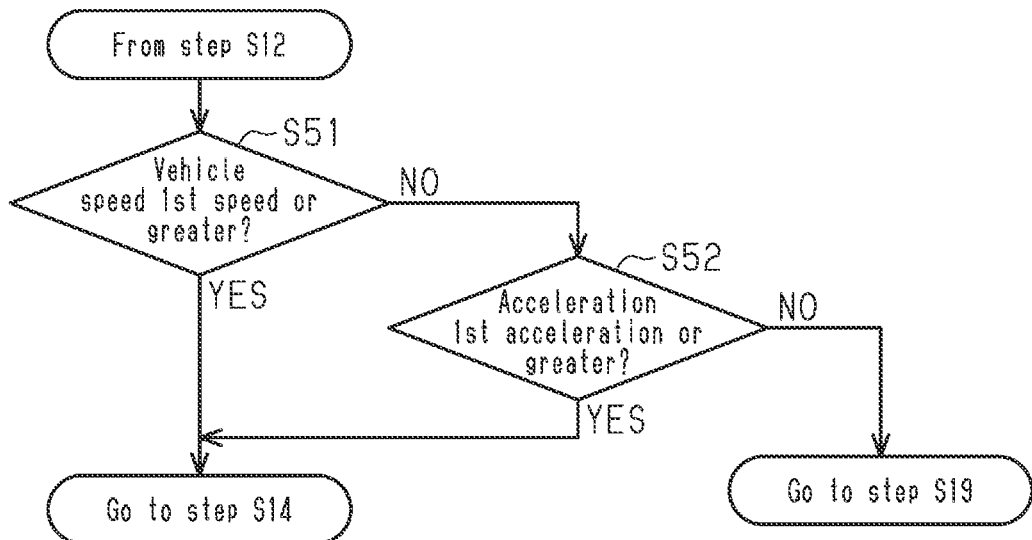
FIG. 7 is a flowchart of a process for controlling storage executed by a third embodiment of an electronic controller.

A process for controlling the storage 84 with the electronic controller 82 in the third embodiment will now be described with reference to FIGS. 3, 4, and 7. For example, in a case where electric power is supplied to the electronic controller 82, the electronic controller 82 starts the process and proceeds to step S11 of the flowchart shown in FIG. 3. In a case where the flowcharts shown in FIGS. 3, 4, and 7 end, the electronic controller 82 repeats the process from step S11 after a predetermined interval, for example, until the supply of electric power stops.

The electronic controller 82 executes steps S11 and S12 shown in FIG. 3 in the same manner as the first embodiment. After step S12 of FIG. 3, the electronic controller 82 proceeds to step S51 shown in FIG. 7.

In step S51, the electronic controller 82 determines whether the vehicle speed is greater than or equal to the first speed. In a case where the vehicle speed is greater than or equal to the first speed, the electronic controller 82 proceeds to step S14. In step S51, in a case where the vehicle speed is less than the first speed, the electronic controller 82 proceeds to step S52. In step S52, the electronic controller 82 determines whether the acceleration is greater than or equal to the first acceleration. In a case where the acceleration is greater than or equal to the first acceleration, the electronic controller 82 proceeds to step S14. In a case where the acceleration is less than the first acceleration, the electronic controller 82 proceeds to step S19.

The electronic controller 82 executes steps S19 to S21 shown in FIG. 4 in the same manner as the first embodiment. In step S21, in a case where the first predetermined period has not elapsed, the electronic controller 82 proceeds to step S51 and repeats the process from step S51.

For example, in at least one of a case where the vehicle speed is greater than or equal to the first speed and a case where the acceleration is greater than or equal to the first acceleration, there is a possibility that the first parameter and the second parameter change at a high rate and that the electronic controller 82 inaccurately predicts the terrain. Consequently, the first information is likely to differ from actual information and be inaccurate. In at least one of a case where the vehicle speed is greater than or equal to the first speed and a case where the acceleration is greater than or equal to the first acceleration, the electronic controller 82 stops the storage 84 from continuously storing predetermined information. This limits generation of inaccurate first information.

Fourth Embodiment

A fourth embodiment of a control device 80 for a human-powered vehicle will now be described with reference to FIGS. 1, 3 to 5, 8, and 9. In the human-powered vehicle control device 80 of the fourth embodiment, the same reference characters are given to those components that are the same as the corresponding components of the first embodiment. Such components will not be described in detail.

Figure 8:
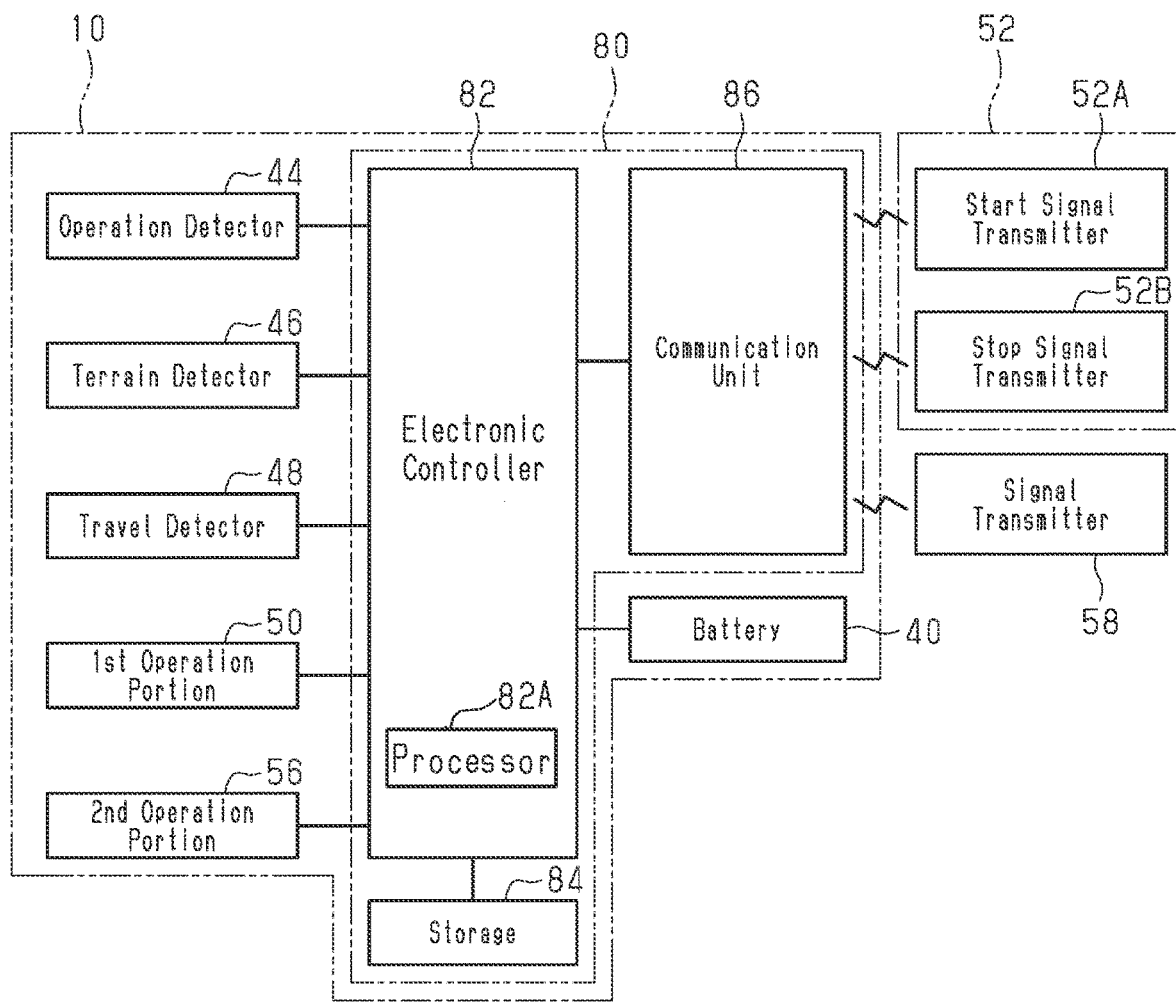
FIG. 8 is a block diagram showing the electrical configuration of a human-powered vehicle including a fourth embodiment of a human-powered vehicle control device.

As shown in FIG. 8, in the fourth embodiment, the human-powered vehicle 10 includes at least one of the operation detector 44 that detects the first parameter correlated to the predetermined operation performed by a rider on the human-powered vehicle 10 and the terrain detector 46 that detects the second parameter correlated to the terrain of the road on which the human-powered vehicle 10 is traveling. In an example, the human-powered vehicle 10 further includes the battery 40 and the suspension 42. The suspension 42 includes the front suspension 42A. The suspension 42 can include a rear suspension. The human-powered vehicle 10 can further include the travel detector 48 and the first operation portion 50.

In an example, the human-powered vehicle 10 further includes a second operation portion 56. In an example, the second operation portion 56 is configured to be operable by the rider. In an example, the second operation portion 56 is provided on at least one of a cycle computer and a smartphone. In an example, the second operation portion 56 includes at least one of a button, a dial, and a lever. The second operation portion 56 is configured to transmit a first signal to the electronic controller 82. The first signal includes, for example, a temporary stop signal for temporarily stopping the storage 84 from storing predetermined information. The first signal can include a stop signal for stopping the storage 84 from storing predetermined information. In an example, in a case where the second operation portion 56 is operated, the electronic controller 82 is configured to temporarily stop the storage 84 from storing predetermined information over a predetermined period. The predetermined period is, for example, shorter than the first predetermined period.

In the fourth embodiment, the control device 80 for a human-powered vehicle includes the electronic controller 82 and the storage 84 configured to continuously store predetermined information including at least one of the first parameter and the second parameter. In an example, the control device 80 further includes a communication unit 86. The communication unit 86 is, for example, configured to perform wired or wireless communication with the external device 52. The communication unit 86 is configured to receive a signal transmitted from the external device 52. The external device 52 includes, for example, at least one of the start signal transmitter 52A, the stop signal transmitter 52B, and a signal transmitter 58. In an example, the signal transmitter 58 is configured to transmit a second signal to the electronic controller 82. The second signal includes, for example, a temporary stop signal for temporarily stopping the storage 84 from storing predetermined information. In an example, the signal transmitter 58 is provided at a location of the road on which the human-powered vehicle 10 is traveling where at least one of the traveling environment of the human-powered vehicle 10 and the traveling state of the human-powered vehicle 10 can greatly change in the course.

In a case where a predetermined condition is satisfied while the storage 84 is storing predetermined information, the electronic controller 82 is configured to temporarily stop the storage 84 from storing the predetermined information over a predetermined period. The predetermined period includes, for example, at least one of a predetermined time, a period during which the crank axle 20 of the human-powered vehicle 10 is rotated by a first rotational angle, and a period during which the wheel 12 of the human-powered vehicle 10 is rotated by a second rotational angle.

The predetermined condition is satisfied, for example, in at least one of a case where the electronic controller 82 receives the first signal, a case where the electronic controller 82 receives the second signal, a case where the gradient of the road corresponds to an uphill and is greater than or equal to a fourth angle, a case where the gradient corresponds to a downhill and is greater than or equal to a fifth angle, a case where the pitch angle of the human-powered vehicle 10 is greater than or equal to a sixth angle, a case where an impact is applied to the human-powered vehicle 10, a case where an impact is applied to the suspension 42, a case where the speed of the human-powered vehicle 10 is greater than or equal to a second speed, and a case where the acceleration of the human-powered vehicle 10 is greater than or equal to a second acceleration.

In an example, the predetermined condition is satisfied in a case where the electronic controller 82 receives the first signal transmitted from the second operation portion 56 operable by the rider. In an example, the predetermined condition is satisfied in a case where the electronic controller 82 receives the second signal transmitted from the signal transmitter 58 provided outside the human-powered vehicle 10.

In an example, the predetermined condition is satisfied in at least one of a case where the gradient of the road corresponds to an uphill and is greater than or equal to the fourth angle, a case where the gradient corresponds to a downhill and is greater than or equal to the fifth angle, and a case where the pitch angle of the human-powered vehicle 10 is greater than or equal to the sixth angle. The fourth angle can be equal to the first angle. The fifth angle can be equal to the second angle. The sixth angle can be equal to the third angle.

In an example, the predetermined condition is satisfied in a case where an impact is applied to the human-powered vehicle 10. The predetermined condition is satisfied in a case where an impact is applied to the suspension 42. In an example, the predetermined condition is satisfied in at least one of a case where the speed of the human-powered vehicle 10 is greater than or equal to the second speed and a case where the acceleration of the human-powered vehicle 10 is greater than or equal to the second acceleration. The second speed can be equal to the first speed. The second acceleration can be equal to the first acceleration.

After the predetermined condition is satisfied and before the predetermined period elapses, the electronic controller 82 is configured to have the storage 84 start storing the predetermined information again in a case where the first operation portion 50 operable by the rider is operated. In an example, after the predetermined condition is satisfied and before the predetermined period elapses, the electronic controller 82 is configured to have the storage 84 start storing the predetermined information in a case where the start signal is received from the first operation portion 50.

Figure 9:
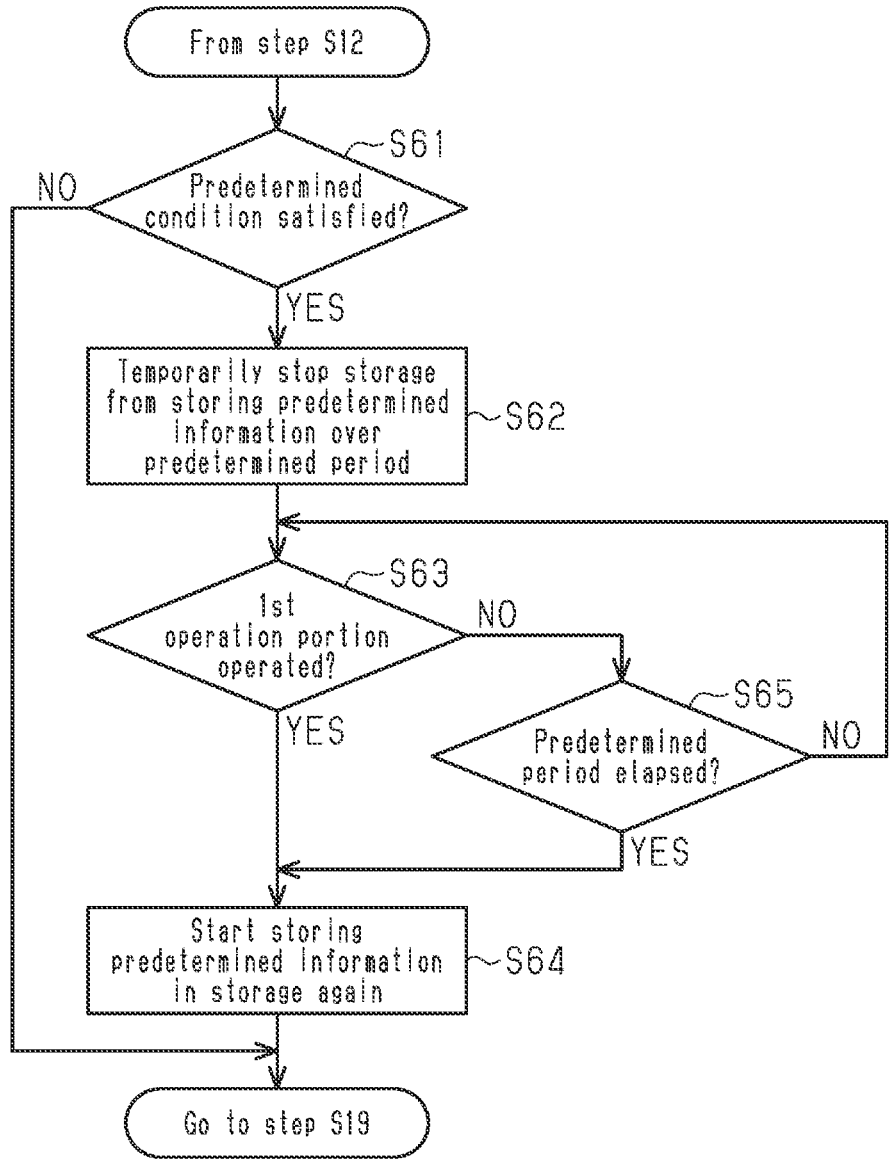
FIG. 9 is a flowchart of a process for controlling storage executed by an electronic controller shown in FIG. 8.
Figure 10:
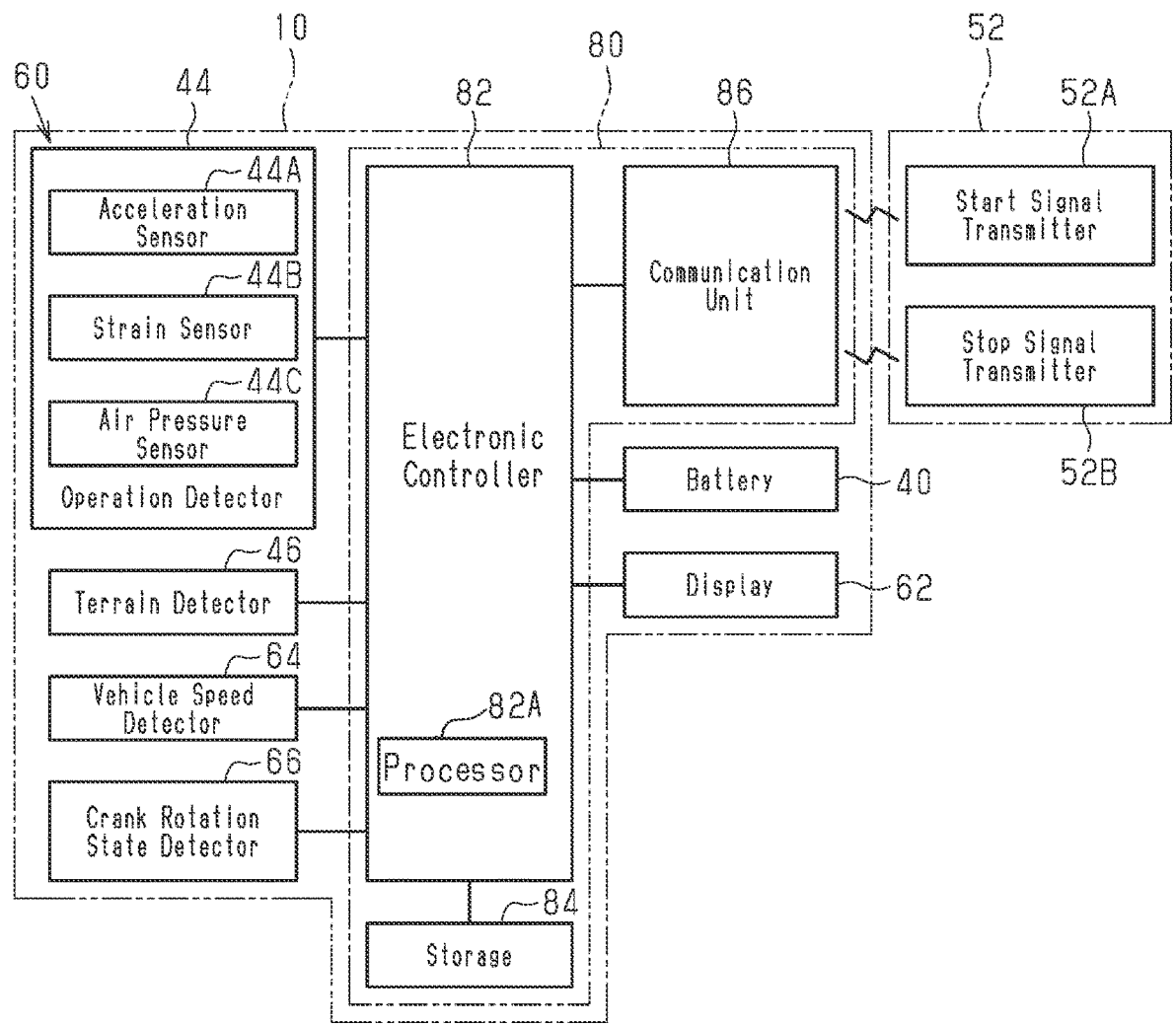
FIG. 10 is a block diagram showing the electrical configuration of a human-powered vehicle including a fifth embodiment of a human-powered vehicle control device.

A process for controlling the storage 84 with the electronic controller 82 in the fourth embodiment will now be described with reference to FIGS. 3, 4, and 9. For example, in a case where electric power is supplied to the electronic controller 82, the electronic controller 82 starts the process and proceeds to step S11 of the flowchart shown in FIG. 3. In a case where the flowcharts shown in FIGS. 3, 4, and 9 end, the electronic controller 82 repeats the process from step S11 after a predetermined interval, for example, until the supply of electric power stops.

The electronic controller 82 executes steps S11 and S12 shown in FIG. 3 in the same manner as the first embodiment. After step S12 of FIG. 3, the electronic controller 82 proceeds to step S61 shown in FIG. 9.

In step S61, the electronic controller 82 determines whether the predetermined condition is satisfied. In an example, the electronic controller 82 determines that the predetermined condition is satisfied, in at least one of a case where the electronic controller 82 receives the first signal, a case where the electronic controller 82 receives the second signal, a case where the gradient of the road corresponds to an uphill and is greater than or equal to the fourth angle, a case where the gradient corresponds to a downhill and is greater than or equal to the fifth angle, a case where the pitch angle of the human-powered vehicle 10 is greater than or equal to the sixth angle, a case where an impact is applied to the human-powered vehicle 10, a case where an impact is applied to the suspension 42, a case where the speed of the human-powered vehicle 10 is greater than or equal to the second speed, and a case where the acceleration of the human-powered vehicle 10 is greater than or equal to the second acceleration. In a case where the predetermined condition is satisfied, the electronic controller 82 proceeds to step S62. In a case where the predetermined condition is not satisfied, the electronic controller 82 proceeds to step S19.

In step S62, the electronic controller 82 temporarily stops the storage 84 from storing the predetermined information over the predetermined period and proceeds to step S63. In step S63, the electronic controller 82 determines whether the first operation portion 50 is operated. In a case where the first operation portion 50 is operated, the electronic controller 82 proceeds to step S64. In a case where the first operation portion 50 is not operated, the electronic controller 82 proceeds to step S65.

In step S65, the electronic controller 82 determines whether the predetermined period has elapsed. In an example, the electronic controller 82 determines that the predetermined period has elapsed in a case where at least one of the predetermined time, a period during which the crank axle 20 of the human-powered vehicle 10 is rotated by the first rotational angle, and a period during which the wheel 12 of the human-powered vehicle 10 is rotated by the second rotational angle has elapsed. In a case where the predetermined period has elapsed, the electronic controller 82 proceeds to step S64. In a case where the predetermined period has not elapsed, the electronic controller 82 proceeds to step S63. In step S64, the electronic controller 82 has the storage 84 start storing the predetermined information again and then proceeds to step S19.

The electronic controller 82 executes steps S19 to S21 shown in FIG. 4 in the same manner as the first embodiment. In step S21, in a case where the first predetermined period has not elapsed, the electronic controller 82 proceeds to step S61 and repeats the process from step S61.

In an example, the electronic controller 82 can be configured to generate first information associating the predetermined operation and the terrain from the predetermined information. In a case where the electronic controller 82 generates the first information associating the predetermined operation and the terrain from the predetermined information, the electronic controller 82 executes the process shown in FIG. 5 in the same manner as the first embodiment.

Fifth Embodiment

A fifth embodiment of a control device 80 for a human-powered vehicle and a detection device 60 for a human-powered vehicle will now be described with reference to FIGS. 1 and 10 to 12. In the human-powered vehicle control device 80 of the fifth embodiment, the same reference characters are given to those components that are the same as the corresponding components of the first to fourth embodiments. Such components will not be described in detail.

In the fifth embodiment, the human-powered vehicle 10 includes the operation detector 44 that detects a first parameter correlated to a predetermined operation performed by the rider on the human-powered vehicle 10. In the fifth embodiment, in an example, the human-powered vehicle 10 includes the terrain detector 46 that detects a second parameter correlated to the terrain of the road on which the human-powered vehicle 10 is traveling. In the fifth embodiment, in an example, the human-powered vehicle 10 includes the operation detector 44, the terrain detector 46, and the suspension 42. In an example, the human-powered vehicle 10 further includes a battery 40.

The detection device 60 for a human-powered vehicle includes the operation detector 44 that detects a first parameter correlated to a predetermined operation performed by the rider on the human-powered vehicle 10. In the fifth embodiment, the human-powered vehicle 10 can include at least one of the first operation portion 50 and the second operation portion 56.

In the fifth embodiment, the control device 80 for a human-powered vehicle includes the electronic controller 82. In the fifth embodiment, the control device 80 for a human-powered vehicle does not have to include the storage 84. In a case where the control device 80 does not include the storage 84, the storage 84 can be provided on the external device 52. The control device 80 can further include the communication unit 86. In an example, the communication unit 86 is configured to receive a signal from at least one of the start signal transmitter 52A and the stop signal transmitter 52B.

In the fifth embodiment, the storage 84 is configured to store the first parameter. In the fifth embodiment, the electronic controller 82 is configured to store the first parameter in the storage 84. In an example, the storage 84 is configured to store the second parameter. In an example, the electronic controller 82 is configured to store the second parameter in the storage 84.

The human-powered vehicle 10 can further include a vehicle speed detector 64. In an example, the vehicle speed detector 64 has the same configuration as the vehicle speed sensor of the acceleration sensor 44A. In a case where the operation detector 44 includes a vehicle speed sensor, the vehicle speed detector 64 can be formed integrally with the vehicle speed sensor.

The human-powered vehicle 10 can further include a crank rotation state detector 66. In an example, the crank rotation state detector 66 is connected to the electronic controller 82 so as to perform wired or wireless communication with the electronic controller 82. The crank rotation state detector 66 detects a rotational amount of at least one of the crank axle 20 and the first rotational body 34. In an example, the crank rotation state detector 66 is configured to detect information corresponding to rotational speed of the crank axle 20. In an example, the crank rotation state detector 66 is configured to detect information corresponding to rotational speed of the first rotational body 34. The information corresponding to rotational speed of the crank axle 20 includes, for example, angular acceleration of the crank axle 20. The information according to rotational speed of the first rotational body 34 includes angular acceleration of the first rotational body 34.

In an example, the crank rotation state detector 66 is provided on the frame 16 of the human-powered vehicle 10. In an example, in a case where the crank rotation state detector 66 is provided on the frame 16, the crank rotation state detector 66 can be configured to include a vehicle speed sensor. In a case where the crank rotation state detector 66 includes a vehicle speed sensor, the electronic controller 82 can be configured to calculate the rotational speed of the crank axle 20 from the vehicle speed detected by the vehicle speed sensor and the transmission ratio.

The crank rotation state detector 66 can be configured to detect a rotational amount of the second rotational body 36. The crank rotation state detector 66 can be configured to detect information corresponding to rotational speed of the second rotational body 36. The information corresponding to rotational speed of the second rotational body 36 includes, for example, angular acceleration of the second rotational body 36. In an example, the crank rotation state detector 66 can output a signal corresponding to rotational speed of the second rotational body 36.

Figure 11:
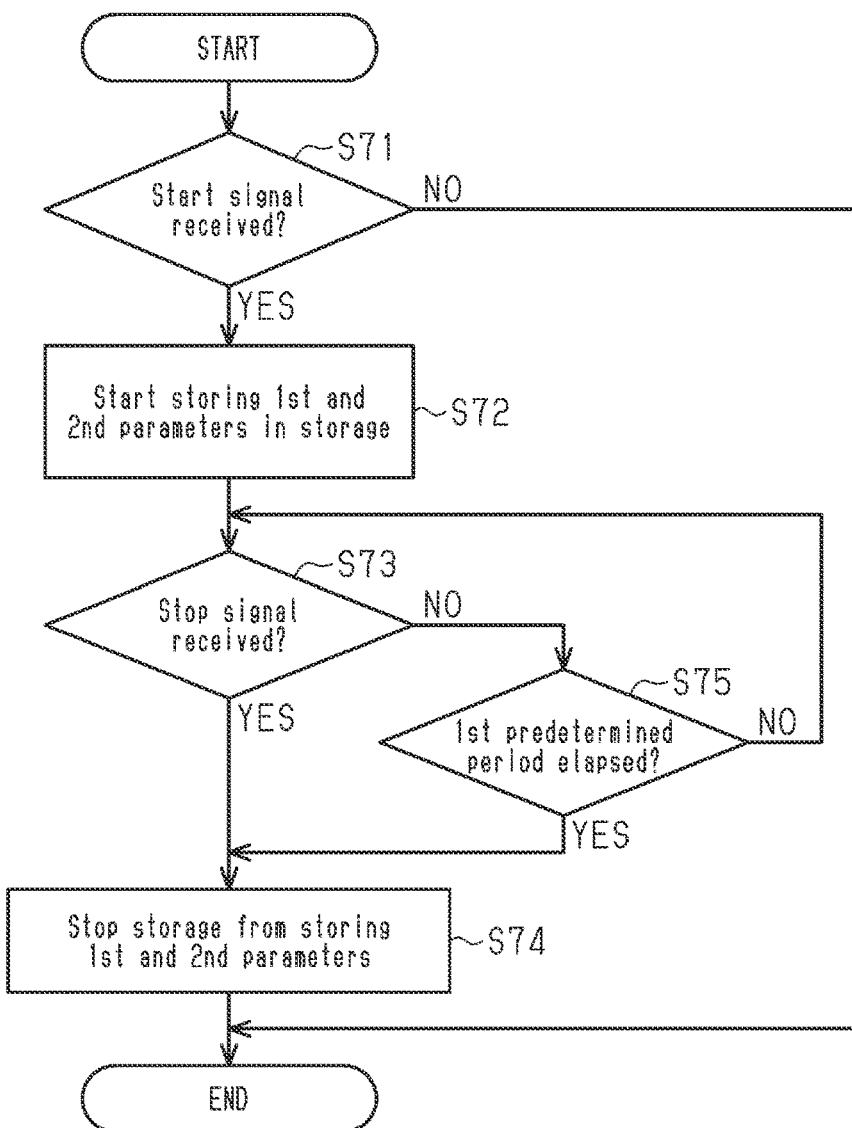
FIG. 11 is a flowchart of a process for controlling storage executed by an electronic controller shown in FIG. 10.

A process for controlling the storage 84 with the electronic controller 82 in the fifth embodiment will now be described with reference to FIG. 11. For example, in a case where electric power is supplied to the electronic controller 82, the electronic controller 82 starts the process and proceeds to step S71 of the flowchart shown in FIG. 11. In a case where the flowchart shown in FIG. 11 ends, the electronic controller 82 repeats the process from step S71 after a predetermined interval, for example, until the supply of electric power stops.

In step S71, the electronic controller 82 determines whether the start signal is received. In a case where the start signal is not received, the electronic controller 82 ends the process. In a case where the start signal is received, the electronic controller 82 proceeds to step S72. In step S72, the electronic controller 82 starts storing the first parameter and the second parameter in the storage 84 and proceeds to step S73. In step S73, the electronic controller 82 determines whether the stop signal is received. In a case where the stop signal is received, the electronic controller 82 proceeds to step S74. In a case where the stop signal is not received, the electronic controller 82 proceeds to step S75.

In step S75, the electronic controller 82 determines whether the first predetermined period has elapsed. In an example, in a case where a period elapsed from receipt of the start signal is greater than or equal to the first predetermined period, the electronic controller 82 determines that the first predetermined period has elapsed. In a case where the first predetermined period has elapsed, the electronic controller 82 proceeds to step S74. In a case where the first predetermined period has not elapsed, the electronic controller 82 proceeds to step S73. In step S74, the electronic controller 82 stops the storage 84 from storing the first parameter and the second parameter and then ends the process.

In an example, the human-powered vehicle 10 further includes a display 62 configured to show operation information related to the predetermined operation. The display 62 includes, for example, a display device. The display 62 can include a cycle computer. The display device includes, for example, a liquid crystal display. The display device can include a segment display or an organic electroluminescent (EL) display. The display 62 can include a light emitting portion such as a light-emitting diode (LED). The display 62 is, for example, configured to perform wired or wireless communication with the electronic controller 82.

The electronic controller 82 is configured to generate first information associating the predetermined operation and the terrain base on the first parameter and the second parameter. In a case where the electronic controller 82 generates the first information associating the predetermined operation and the terrain from the predetermined information, the electronic controller 82 executes the process shown in FIG. 5 in the same manner as the first embodiment. The electronic controller 82 can be configured to show the first information on the display 62. The electronic controller 82 can be configured to generate first information associating information related to the predetermined operation and the terrain. The information related to the predetermined operation includes, for example, a load balance of loads applied to the front wheel 12F and the rear wheel 12R. The information related to the predetermined operation can include at least one of a load applied to the front wheel 12F and a load applied to the rear wheel 12R.

In an example, the electronic controller 82 is configured to show the operation information on the display 62. In an example, the electronic controller 82 is configured to show history information related to history of the operation information on the display 62. In an example, the electronic controller 82 is configured to show the first parameter stored in the storage 84 on the display 62. The electronic controller 82 is configured to show the second parameter stored in the storage 84 on the display 62.

In an example, the electronic controller 82 is configured to generate display information related to at least one of the operation information, the history information, the first information, the first parameter, and the second parameter. The display information includes, for example, at least one of a graph, a numerical value, a gauge, a letter, and light. The operation information includes, for example, information related to the first operation and the second operation. The display 62 can be configured to show at least one of the first information and the history information related to history of the operation information. With the operation information related to the predetermined operation, for example, the location where the first operation was performed and the location where the second operation was performed are indicated in different colors or by different types of line on the two-dimensional or three-dimensional graph or image.

The electronic controller 82 is configured to control the display 62 to show the display information. The display 62 can include a speaker instead of or in addition to a display device. The speaker indicates the display information by, for example, sound. In a case where the display 62 includes a speaker, the display information includes, for example, a voice, a melody, a beep sound, or the like. In an example, in a case where the human-powered vehicle 10 is traveling on a course and a record of the same course is stored in the storage 84, the electronic controller 82 can show the display information based on the record of the course. In an example, the electronic controller 82 is configured to show what type of operation was performed at each point of the course during traveling on the course. The display 62 shows what type of operation was performed at each point of the course, for example, by an image, a voice, a melody, a beep sound, or the like. The record of the course stored in the storage 84 can be information related to previous riding of the rider or can be information related to riding of a professional rider.

For example, in a case where showing of display information is requested, the electronic controller 82 controls the display 62 so that the display information is shown on the display 62. In an example, in a case where a display request signal is received from a display operation portion operable by the rider, the electronic controller 82 is configured to determine that showing of display information is requested.

Figure 12:
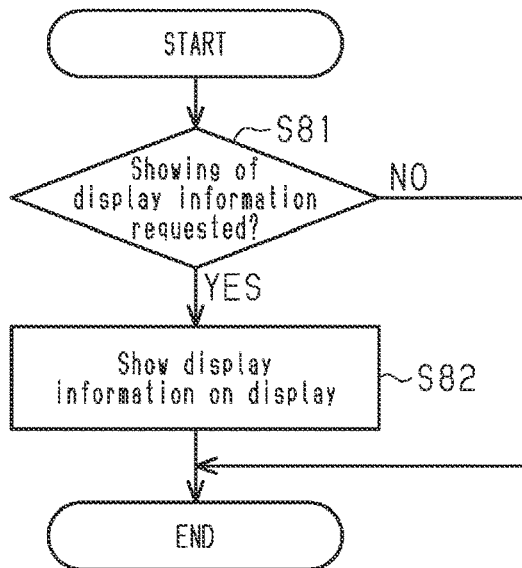
FIG. 12 is a flowchart of a process for controlling a display executed by the electronic controller shown in FIG. 10.
Figure 13:
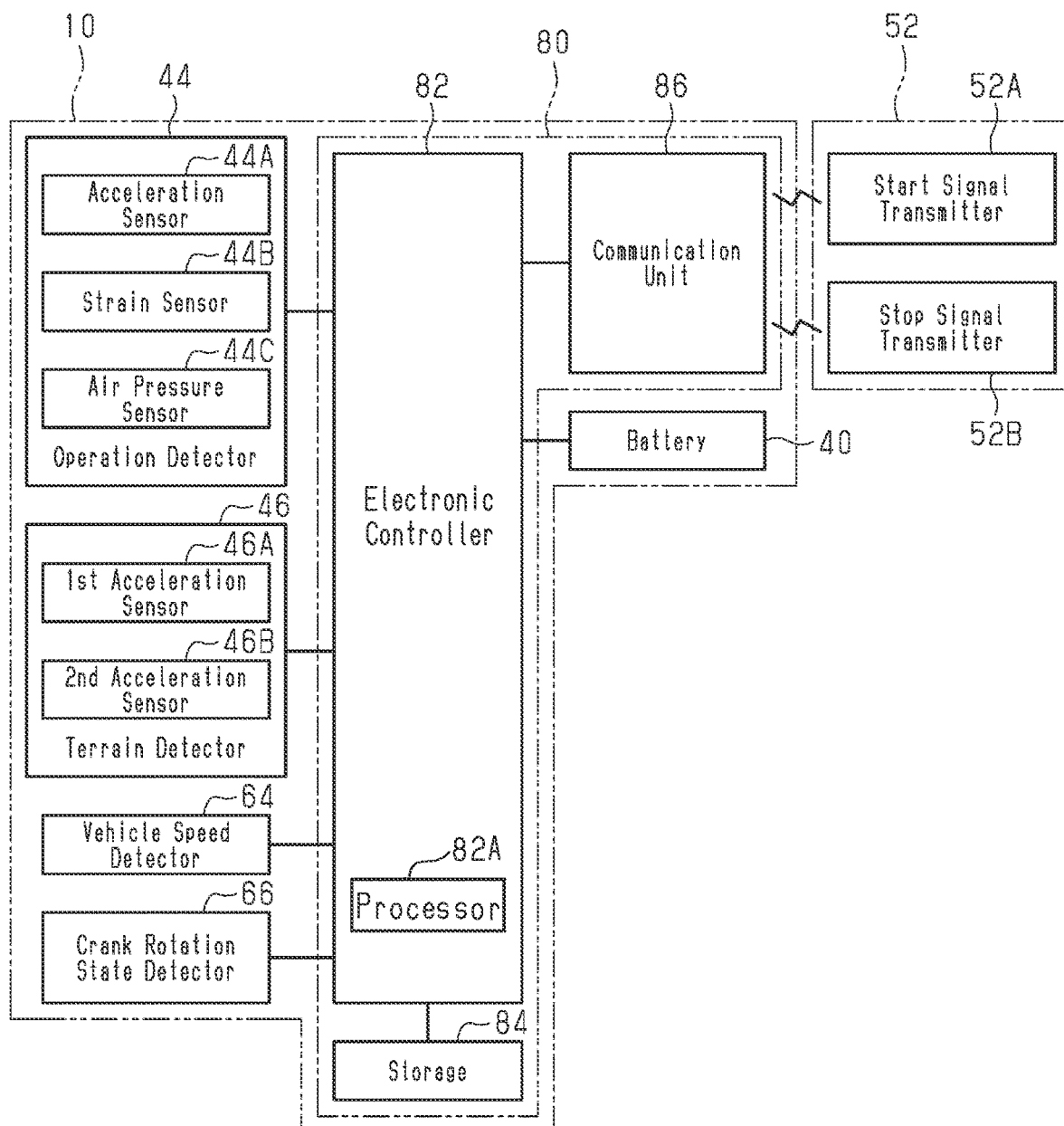
FIG. 13 is a block diagram showing the electrical configuration of a human-powered vehicle including a sixth embodiment of a human-powered vehicle control device.

A process for controlling the display 62 with the electronic controller 82 will now be described with reference to FIG. 12. For example, in a case where electric power is supplied to the electronic controller 82, the electronic controller 82 starts the process and proceeds to step S81 of the flowchart shown in FIG. 12. In a case where the flowchart shown in FIG. 12 ends, the electronic controller 82 repeats the process from step S81 after a predetermined interval, for example, until the supply of electric power stops.

In step S81, the electronic controller 82 determines whether showing of display information is requested. In an example, in a case where a display request signal is received from a display operation portion operable by the rider, the electronic controller 82 determines that showing of display information is requested. In a case where showing of display information is not requested, the electronic controller 82 ends the process. In a case where showing of display information is requested, the electronic controller 82 proceeds to step S82. In step S82, the electronic controller 82 shows the display information on the display 62 and then ends the process.

Sixth Embodiment

A sixth embodiment of a control device 80 for a human-powered vehicle will now be described with reference to FIGS. 1 and 13 to 18. In the human-powered vehicle control device 80 of the sixth embodiment, the same reference characters are given to those components that are the same as the corresponding components of the first, fourth, and fifth embodiments. Such components will not be described in detail.

In the sixth embodiment, the human-powered vehicle 10 includes the operation detector 44 that detects a first parameter correlated to a predetermined operation performed by the rider on the human-powered vehicle 10. The acceleration sensor 44A is provided on at least one of the wheel axle 12A of the human-powered vehicle 10 and a portion of the human-powered vehicle 10 closer to the wheel axle 12A than the moving portion of the suspension 42.

The human-powered vehicle 10 further includes the terrain detector 46. The terrain detector 46 includes the first acceleration sensor 46A. The first acceleration sensor 46A is provided on at least one of the wheel axle 12A of the human-powered vehicle 10 and a portion of the human-powered vehicle 10 closer to the wheel axle 12A than the moving portion of the suspension 42.

The terrain detector 46 includes the second acceleration sensor 46B. The second acceleration sensor 46B is provided on at least one of the wheel axle 12A of the human-powered vehicle 10 and a portion of the human-powered vehicle 10 closer to the wheel axle 12A than the moving portion of the suspension 42.

The operation detector 44 and the terrain detector 46 can be separately provided on the human-powered vehicle 10 or can be provided as a single detector on the human-powered vehicle 10. In a case where the operation detector 44 and the terrain detector 46 are configured as a single detector, the acceleration sensor 44A, the first acceleration sensor 46A, and the second acceleration sensor 46B can be a single sensor. In a case where the operation detector 44 includes at least one of the strain sensor 44B, and the air pressure sensor 44C, the first acceleration sensor 46A and the second acceleration sensor 46B can be a single sensor.

In a case where each of the operation detector 44 and the terrain detector 46 includes an inertial measurement unit, the terrain detector 46 can be provided on at least one of the wheel axle 12A and a portion of the human-powered vehicle 10 closer to the wheel axle 12A than the moving portion of the suspension 42, and the operation detector 44 can be provided on a portion of the human-powered vehicle 10 located above the moving portion of the suspension 42. In a case where the suspension 42 includes the front suspension 42A, the portion of the human-powered vehicle 10 located above the moving portion of the suspension 42 includes, for example, at least one of the handlebar 28, the stem 30, a head tube of the frame 16, a top tube of the frame 16, a seat tube of the frame 16, a down tube of the frame 16, a seat stay of the frame 16, and a chain stay of the frame 16. In a case where the suspension 42 includes a rear suspension, the portion of the human-powered vehicle 10 located above the moving portion of the suspension 42 includes, for example, at least one of the handlebar 28, the stem 30, the head tube, the top tube, and the seat stay. In a case where the operation detector 44 includes at least one of the strain sensor 44B and the air pressure sensor 44C, the operation detector 44 can be provided on at least one of the wheel axle 12A and a portion of the human-powered vehicle 10 closer to the wheel axle 12A than the moving portion of the suspension 42.

In an example, the human-powered vehicle 10 further includes the vehicle speed detector 64 that detects speed of the human-powered vehicle 10. In an example, the human-powered vehicle 10 further includes the crank rotation state detector 66.

In the sixth embodiment, the control device 80 for a human-powered vehicle includes the electronic controller 82. In an example, the control device 80 for a human-powered vehicle further includes the storage 84. The control device 80 can further include the communication unit 86. In an example, the communication unit 86 is configured to receive a signal from at least one of the start signal transmitter 52A and the stop signal transmitter 52B.

In the sixth embodiment, the electronic controller 82 is configured to determine the predetermined operation based on acceleration in the fore-aft direction. In an example, the electronic controller 82 is configured to determine unevenness of the road from acceleration in the vertical direction. The acceleration in the vertical direction corresponds to, for example, a change rate related to at least one of the pitch angle and the roll angle. In an example, the electronic controller 82 is configured to determine curving of the road from the change rate related to at least one of the pitch angle and the roll angle. In an example, in a case where acceleration in an upward direction is detected and then acceleration in a downward direction is detected, the electronic controller 82 can be configured to determine that the road has a ridge. In an example, in a case where acceleration in a downward direction is detected and then acceleration in an upward direction is detected, the electronic controller 82 can be configured to determine that the road has a valley.

In the sixth embodiment, for example, the electronic controller 82 is configured to determine curving of the road from acceleration in the lateral direction. The acceleration in the lateral direction corresponds to, for example, a change rate related to at least one of the roll angle and the yaw angle. In an example, the electronic controller 82 is configured to determine curving of the road from the change rate related to at least one of the roll angle and the yaw angle. In an example, after acceleration in a leftward direction is detected, the electronic controller 82 can be configured to determine that the curving of the road is leftward. In an example, after acceleration in a rightward direction is detected, the electronic controller 82 can be configured to determine that the curving of the road is rightward.

In an example, the electronic controller 82 is configured to store the first parameter in the storage 84. In an example, the electronic controller 82 is configured to store the second parameter in the storage 84.

The electronic controller 82 is configured to store at least one of the determination related to unevenness of the road, the determination related to curving of the road, and the determination of the predetermined operation. In an example, the electronic controller 82 is configured to store the determination related to unevenness of the road in the storage 84. In an example, the electronic controller 82 is configured to store the determination related to curving of the road in the storage 84. In an example, the electronic controller 82 is configured to store the determination of the predetermined operation in the storage 84.

Figure 14:
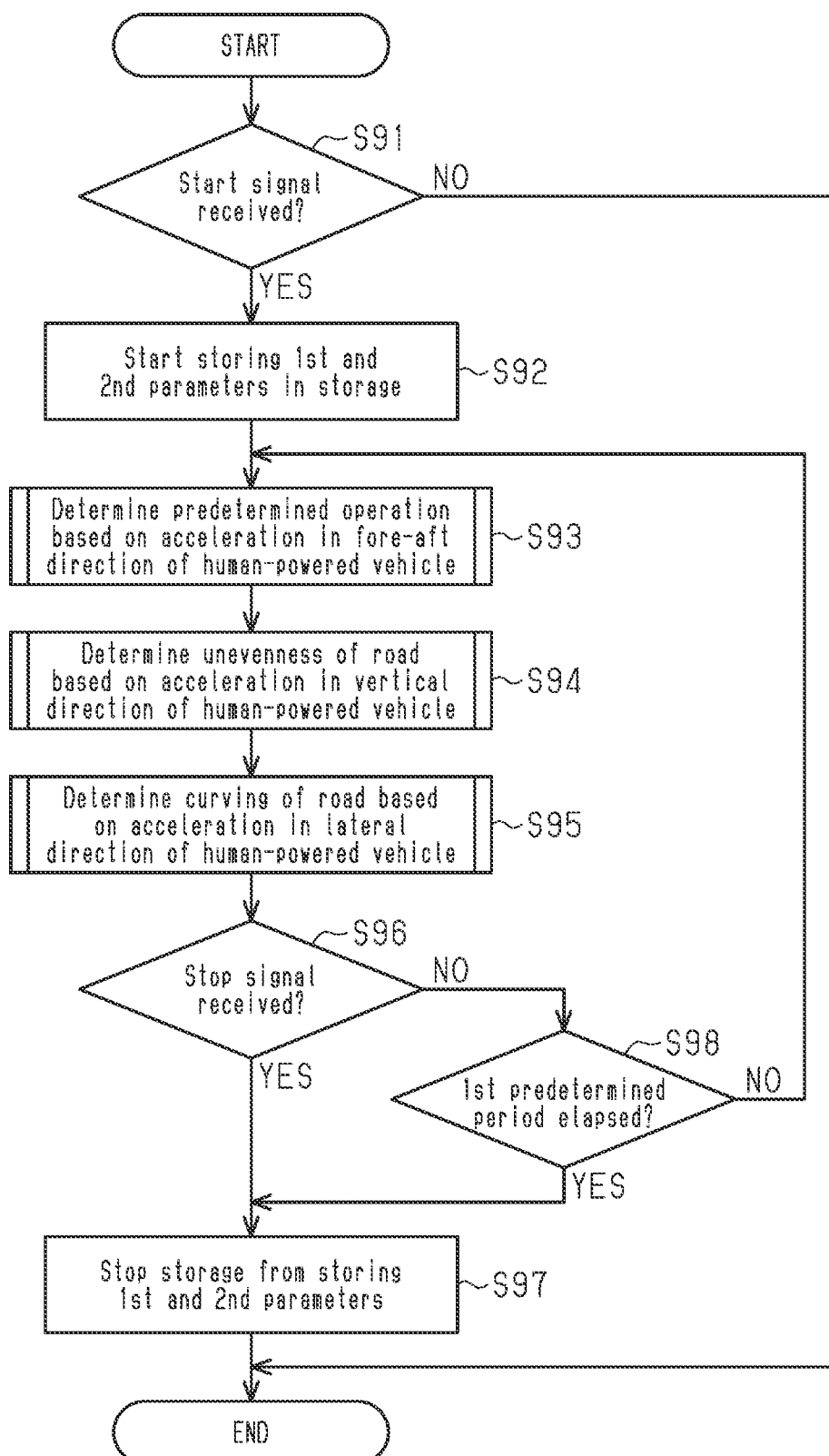
FIG. 14 is a flowchart of a process for controlling storage executed by an electronic controller shown in FIG. 13.

A process for controlling the storage 84 with the electronic controller 82 in the sixth embodiment will now be described with reference to FIG. 14. For example, in a case where electric power is supplied to the electronic controller 82, the electronic controller 82 starts the process and proceeds to step S91 of the flowchart shown in FIG. 14. In a case where the flowchart shown in FIG. 14 ends, the electronic controller 82 repeats the process from step S91 after a predetermined interval, for example, until the supply of electric power stops.

In step S91, the electronic controller 82 determines whether the start signal is received. In a case where the start signal is not received, the electronic controller 82 ends the process. In a case where the start signal is received, the electronic controller 82 proceeds to step S92. In step S92, the electronic controller 82 starts storing the first parameter and the second parameter in the storage 84 and proceeds to step S93.

In step S93, the electronic controller 82 determines the predetermined operation from acceleration in the fore-aft direction of the human-powered vehicle 10 and then proceeds to step S94. In step S94, the electronic controller 82 determines unevenness of the road from acceleration in the vertical direction of the human-powered vehicle 10 and then proceeds to step S95. In step S95, the electronic controller 82 determines curving of the road from acceleration in the lateral direction of the human-powered vehicle 10 and then proceeds to step S96.

In step S96, the electronic controller 82 determines whether the stop signal is received. In a case where the stop signal is received, the electronic controller 82 proceeds to step S97. In a case where the stop signal is not received, the electronic controller 82 proceeds to step S98. In step S98, the electronic controller 82 determines whether the first predetermined period has elapsed. In a case where the first predetermined period has elapsed, the electronic controller 82 proceeds to step S97. In a case where the first predetermined period has not elapsed, the electronic controller 82 proceeds to step S93 and repeats the process from step S93. In step S97, the electronic controller 82 stops the storage 84 from storing the first parameter and the second parameter and then ends the process.

Figure 15:
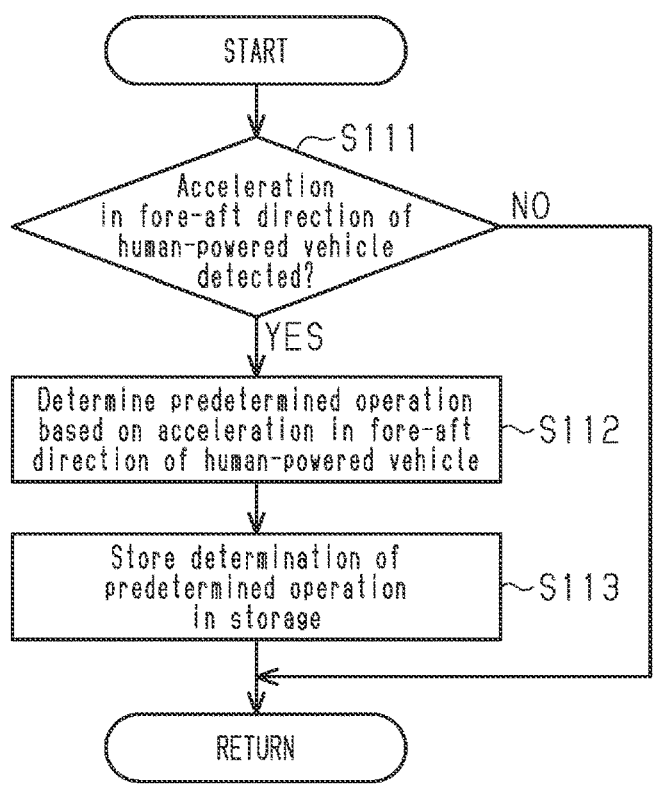
FIG. 15 is a flowchart of a subroutine for determining a predetermined operation based on acceleration in the fore-aft direction of the human-powered vehicle shown in FIG. 14.

The subroutine of step S93 in the flowchart shown in FIG. 14 will now be described with reference to FIG. 15. In step S111, the electronic controller 82 determines whether acceleration in the fore-aft direction of the human-powered vehicle 10 is detected. In a case where acceleration in the fore-aft direction of the human-powered vehicle 10 is detected, the electronic controller 82 proceeds to step S112. In a case where acceleration in the fore-aft direction of the human-powered vehicle 10 is not detected, the electronic controller 82 ends the process.

In step S112, the electronic controller 82 determines the predetermined operation from acceleration in the fore-aft direction of the human-powered vehicle 10 and then proceeds to step S113. In an example, in a case where acceleration in a frontward direction is detected, the electronic controller 82 determines that the first operation, in which the rider pushes the handlebar 28 of the human-powered vehicle 10, is performed. In an example, in a case where acceleration in a backward direction is detected, the electronic controller 82 determines that the second operation, in which the rider pulls the handlebar 28, is performed. In step S113, the electronic controller 82 stores the determination of the predetermined operation in the storage 84. Step S113 can be omitted from the subroutine of step S93 of the flowchart shown in FIG. 14.

Figure 16:
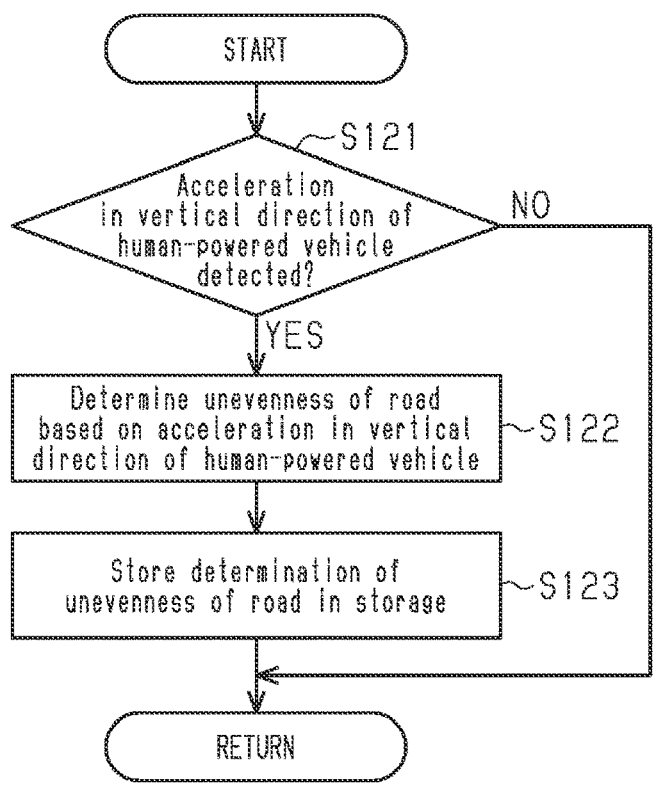
FIG. 16 is a flowchart of a subroutine for determining unevenness of the road based on acceleration in the vertical direction of the human-powered vehicle shown in FIG. 14.

The subroutine of step S94 in the flowchart shown in FIG. 14 will now be described with reference to FIG. 16. In step S121, the electronic controller 82 determines whether acceleration in the vertical direction of the human-powered vehicle 10 is detected. In a case where acceleration in the vertical direction of the human-powered vehicle 10 is detected, the electronic controller 82 proceeds to step S122. In a case where acceleration in the vertical direction of the human-powered vehicle 10 is not detected, the electronic controller 82 ends the process.

In step S122, the electronic controller 82 determines the predetermined operation from acceleration in the vertical direction of the human-powered vehicle 10 and then proceeds to step S123. In an example, in a case where acceleration in an upward direction is detected and then acceleration in a downward direction is detected, the electronic controller 82 determines that the road has a ridge. In an example, in a case where acceleration in a downward direction is detected and then acceleration in an upward direction is detected, the electronic controller 82 determines that the road has a valley. In step S123, the electronic controller 82 stores the determination of unevenness of the road in the storage 84. Step S123 can be omitted from the subroutine of step S94 of the flowchart shown in FIG. 14.

Figure 17:
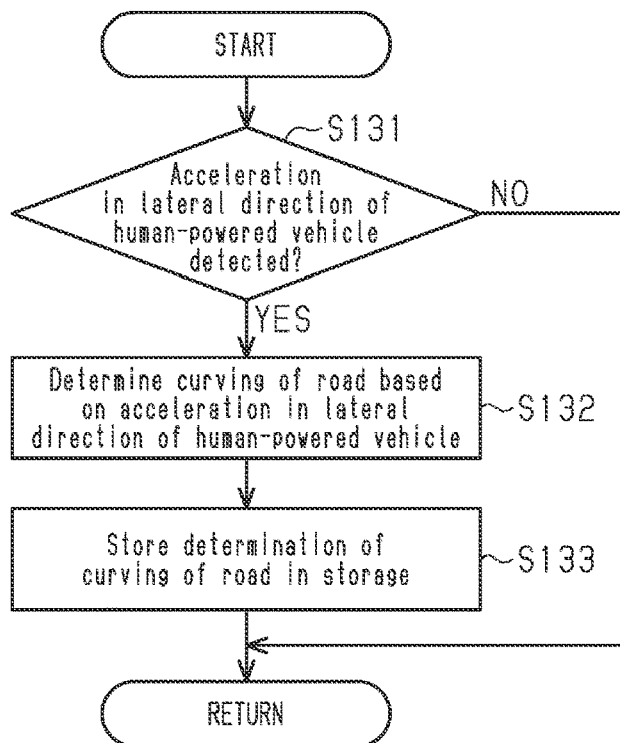
FIG. 17 is a flowchart of a subroutine for determining curving of the road based on acceleration in the lateral direction of the human-powered vehicle shown in FIG. 14.

The subroutine of step S95 in the flowchart shown in FIG. 14 will now be described with reference to FIG. 17. In step S131, the electronic controller 82 determines whether acceleration in the lateral direction of the human-powered vehicle 10 is detected. In a case where acceleration in the lateral direction of the human-powered vehicle 10 is detected, the electronic controller 82 proceeds to step S132. In a case where acceleration in the lateral direction of the human-powered vehicle 10 is not detected, the electronic controller 82 ends the process.

In step S132, the electronic controller 82 determines the predetermined operation from acceleration in the lateral direction of the human-powered vehicle 10 and then proceeds to step S133. In an example, after acceleration in a leftward direction is detected, the electronic controller 82 determines that the curving of the road is leftward. In an example, after acceleration in a rightward direction is detected, the electronic controller 82 determines that the curving of the road is rightward. In step S133, the electronic controller 82 stores the determination of curving of the road in the storage 84. Step S133 can be omitted from the subroutine of step S95 of the flowchart shown in FIG. 14.

In the sixth embodiment, for example, the electronic controller 82 is configured to generate first information associating the predetermined operation and the terrain base on the first parameter and the second parameter. In an example, the electronic controller 82 is configured to generate second information associating the vehicle speed and the terrain based on the second parameter and the vehicle speed.

In an example, the electronic controller 82 calculates the distance traveled based on the vehicle speed and the wheel diameter. In an example, the electronic controller 82 is configured to predict the terrain from the second parameter at each predetermined distance traveled. In an example, the electronic controller 82 is configured to predict at least one of gradient and curving from the second parameter at each predetermined distance traveled. The second information includes at least one of gradient and curving that are predicted. In an example, the second information is shown on the display device. In an example, the terrain included in the first information is shown by a two-dimensional or three-dimensional graph or image.

In an example, the electronic controller 82 is configured to generate the second information in a case where generation of the second information is requested. In an example, in a case where a signal related to a request to generate the second information is transmitted from an information processing device, the electronic controller 82 is configured to determine that generation of the second information is requested. The information processing device is configured to perform wireless or wired communication with the electronic controller 82. The information processing device includes, for example, at least one of a personal computer, a smartphone, a tablet computer, and a cycle computer. The electronic controller 82 can be configured to transmit the predetermined information to the information processing device so that the information processing device generates the second information.

Figure 18:
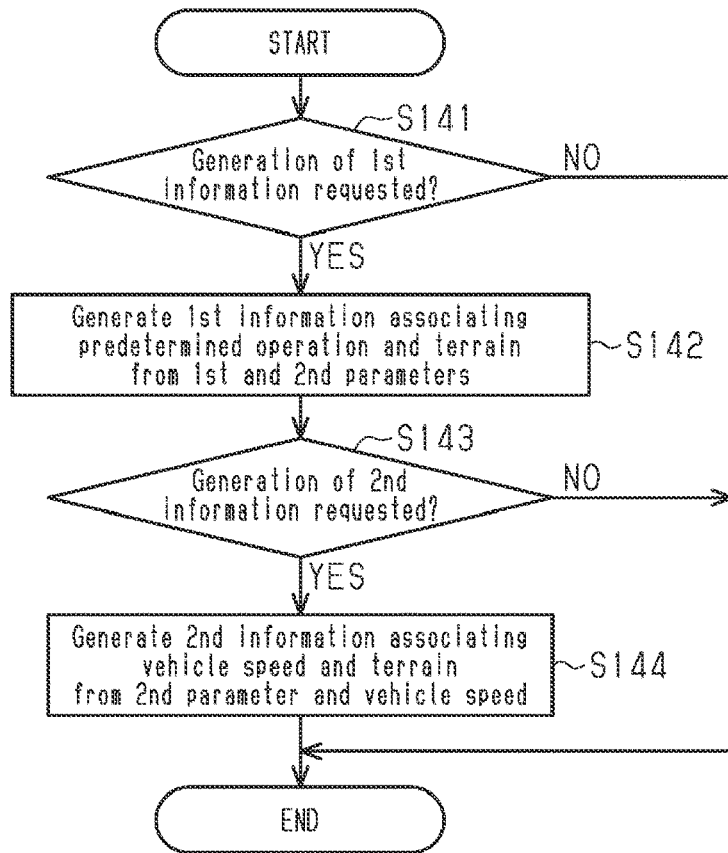
FIG. 18 is a flowchart of a process for generating first information and second information executed by the electronic controller shown in FIG. 13.
Figure 19:
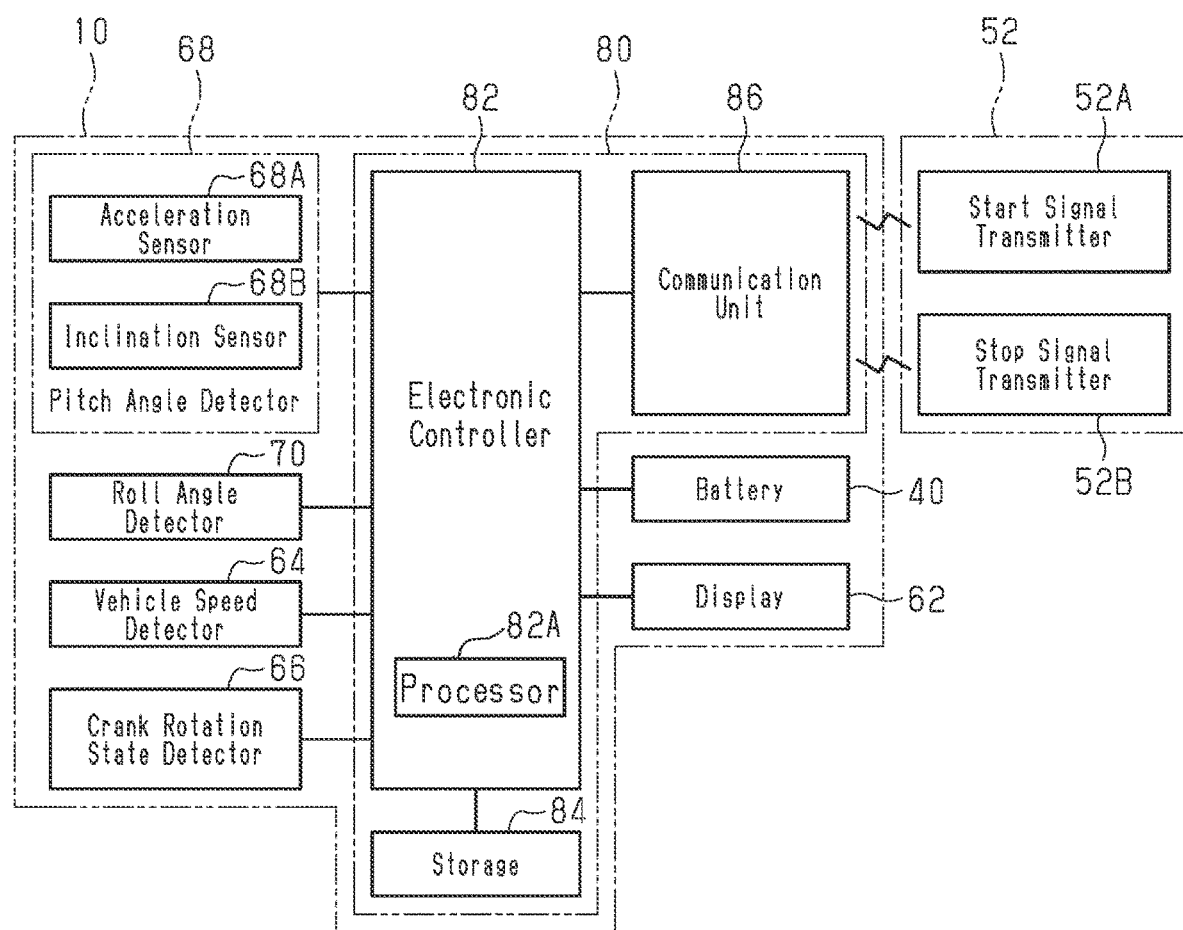
FIG. 19 is a block diagram showing the electrical configuration of a human-powered vehicle including a seventh embodiment of a human-powered vehicle control device.

A process for generating the first information and the second information with the electronic controller 82 will now be described with reference to FIG. 18. For example, in a case where electric power is supplied to the electronic controller 82, the electronic controller 82 starts the process and proceeds to step S141 of the flowchart shown in FIG. 18. In a case where the flowchart shown in FIG. 18 ends, the electronic controller 82 repeats the process from step S141 after a predetermined interval, for example, until the supply of electric power stops.

In step S141, the electronic controller 82 determines whether generation of the first information is requested. In an example, in a case where a signal related to a request to generate the first information is transmitted from the information processing device, the electronic controller 82 determines that generation of the first information is requested. In a case where generation of the first information is requested, the electronic controller 82 proceeds to step S142. In a case where generation of the first information is not requested, the electronic controller 82 ends the process. In step S142, the electronic controller 82 generates first information associating the predetermined operation and the terrain base on the first parameter and the second parameter and then proceeds to step S143.

In step S143, the electronic controller 82 determines whether generation of the second information is requested. In an example, in a case where a signal related to a request to generate the second information is transmitted from an information processing device, the electronic controller 82 determines that generation of the second information is requested. In a case where generation of the second information is requested, the electronic controller 82 proceeds to step S144. In a case where generation of the second information is not requested, the electronic controller 82 ends the process. In step S144, the electronic controller 82 generates the second information associating the vehicle speed and the terrain from the second parameter and the vehicle speed and then ends the process.

Seventh Embodiment

A seventh embodiment of a control device 80 for a human-powered vehicle and a method for controlling a human-powered vehicle will now be described with reference to FIGS. 1 and 19 to 22. In the human-powered vehicle control device 80 of the seventh embodiment, the same reference characters are given to those components that are the same as the corresponding components of the first and fourth to sixth embodiments. Such components will not be described in detail.

In the seventh embodiment, the human-powered vehicle 10 includes a pitch angle detector 68. In an example, the pitch angle detector 68 detects the pitch angle of the human-powered vehicle 10. The pitch angle detector 68 includes at least one of an acceleration sensor 68A and an inclination sensor 68B. In an example, the inclination sensor 68B includes a gyro sensor. In an example, the pitch angle detector 68 is provided on the wheel axle 12A of the human-powered vehicle 10. In an example, the pitch angle detector 68 is configured in the same manner as the acceleration sensor 44A of the first embodiment that is configured to detect a pitch angle.

In an example, the human-powered vehicle 10 further includes a roll angle detector 70. In an example, the roll angle detector 70 detects the roll angle of the human-powered vehicle 10. In an example, the roll angle detector 70 is provided on the wheel axle 12A of the human-powered vehicle 10. In an example, the roll angle detector 70 is configured in the same manner as the acceleration sensor 44A of the first embodiment that is configured to detect a roll angle. The pitch angle detector 68 and the roll angle detector 70 can be separate detectors or can be a single detector configured to detect a pitch angle and a roll angle. In the seventh embodiment, the human-powered vehicle 10 can include the vehicle speed detector 64 and the crank rotation state detector 66.

In the seventh embodiment, the control device 80 for a human-powered vehicle includes the electronic controller 82 provided on the human-powered vehicle 10. In an example, the control device 80 further includes the storage 84. The control device 80 can further include the communication unit 86. In an example, the communication unit 86 is configured to receive a signal from at least one of the start signal transmitter 52A and the stop signal transmitter 52B.

The electronic controller 82 is configured to obtain a detection result of the pitch angle detector 68 provided on the human-powered vehicle 10 to detect the pitch angle. The electronic controller 82 is configured to obtain a detection result of the roll angle detector 70. The electronic controller 82 is configured to obtain at least one of rotational speed of the wheel 12 and a rotational amount of the wheel 12 from the vehicle speed detector 64.

In an example, the electronic controller 82 is configured to store at least one of the rotational speed of the wheel 12, the rotational amount of the wheel 12, the pitch angle of the human-powered vehicle 10, and the roll angle of the human-powered vehicle 10 in the storage 84. In an example, in a case where the start signal is received, the electronic controller 82 is configured to start storing at least one of the rotational speed of the wheel 12, the rotational amount of the wheel 12, the pitch angle of the human-powered vehicle 10, and the roll angle of the human-powered vehicle 10 in the storage 84. In an example, in a case where the stop signal is received, the electronic controller 82 is configured to stop the storage 84 from storing at least one of the rotational speed of the wheel 12, the rotational amount of the wheel 12, the pitch angle of the human-powered vehicle 10, and the roll angle of the human-powered vehicle 10.

Figure 20:
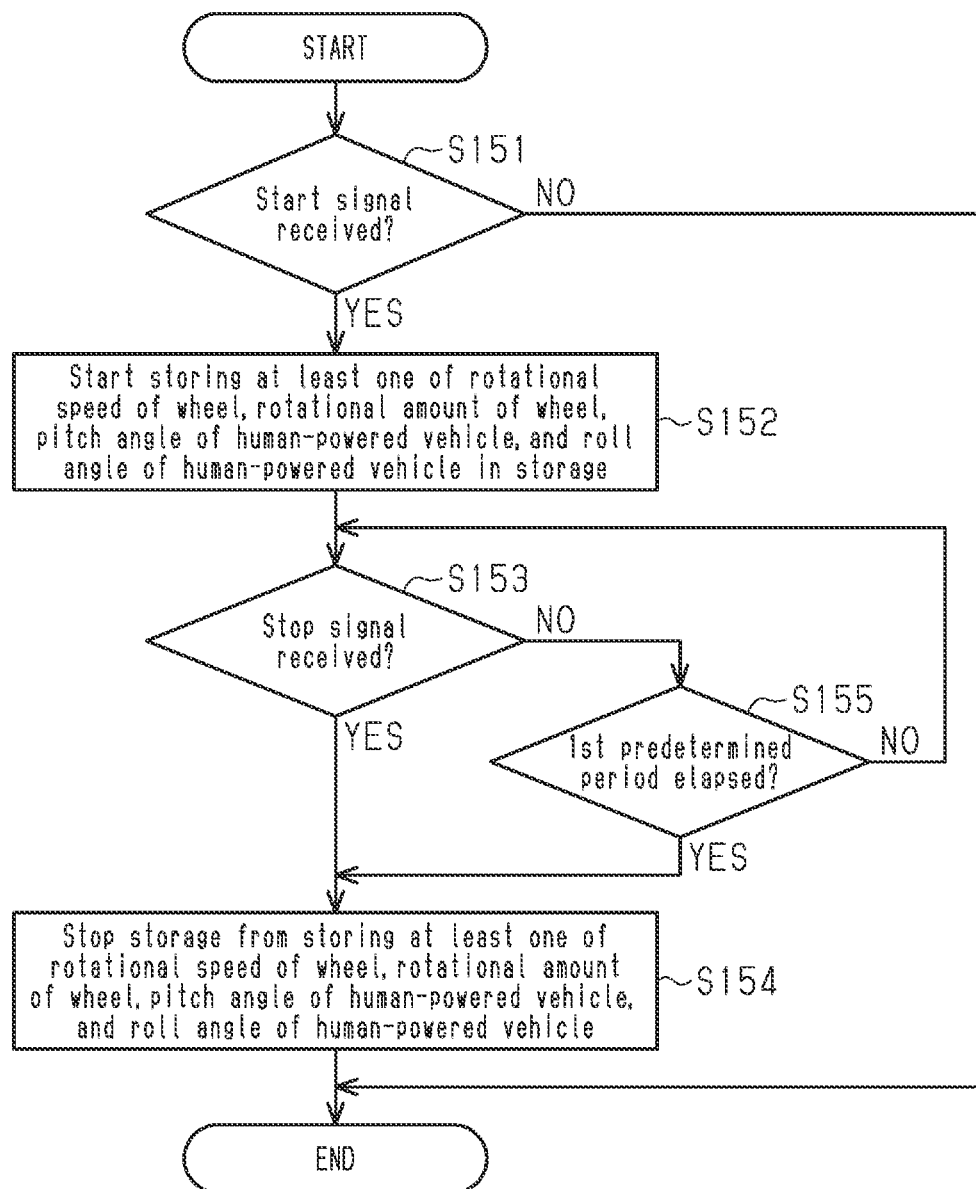
FIG. 20 is a flowchart of a process for controlling storage executed by an electronic controller shown in FIG. 19.

A process for controlling the storage 84 with the electronic controller 82 in the seventh embodiment will now be described with reference to FIG. 20. For example, in a case where electric power is supplied to the electronic controller 82, the electronic controller 82 starts the process and proceeds to step S151 of the flowchart shown in FIG. 20. In a case where the flowchart shown in FIG. 20 ends, the electronic controller 82 repeats the process from step S151 after a predetermined interval, for example, until the supply of electric power stops.

In step S151, the electronic controller 82 determines whether the start signal is received. In a case where the start signal is not received, the electronic controller 82 ends the process. In a case where the start signal is received, the electronic controller 82 proceeds to step S152. In step S152, the electronic controller 82 starts storing at least one of the rotational speed of the wheel 12, the rotational amount of the wheel 12, the pitch angle of the human-powered vehicle 10, and the roll angle of the human-powered vehicle 10 in the storage 84 and then proceeds to step S153.

In step S153, the electronic controller 82 determines whether the stop signal is received. In a case where the stop signal is received, the electronic controller 82 proceeds to step S154. In a case where the stop signal is not received, the electronic controller 82 proceeds to step S155. In step S155, the electronic controller 82 determines whether the first predetermined period has elapsed. In an example, in a case where a period elapsed from receipt of the start signal is greater than or equal to the first predetermined period, the electronic controller 82 determines that the first predetermined period has elapsed. In a case where the first predetermined period has elapsed, the electronic controller 82 proceeds to step S154. In a case where the first predetermined period has not elapsed, the electronic controller 82 proceeds to step S153 and repeats the process from step S153. In step S154, the electronic controller 82 stops the storage 84 from storing at least one of the rotational speed of the wheel 12, the rotational amount of the wheel 12, the pitch angle of the human-powered vehicle 10, and the roll angle of the human-powered vehicle 10 and then ends the process.

The electronic controller 82 is configured to execute a control method for a human-powered vehicle. In an example, in a case where the control method includes processes and execution of each process is requested, the electronic controller 82 is configured to execute the control method. In an example, in a case where a signal related to an execution request of each process of the control method is transmitted from the information processing device, the electronic controller 82 is configured to determine that execution of the control method is requested. The information processing device is configured to perform wireless or wired communication with the electronic controller 82. The information processing device includes, for example, at least one of a personal computer, a smartphone, a tablet computer, and a cycle computer.

The control method for a human-powered vehicle includes a first process of calculating a first movement distance on the road on which the human-powered vehicle 10 is traveling based on at least one of the rotational speed of the wheel 12 of the human-powered vehicle 10 and the rotational amount of the wheel 12, a second process of calculating a second movement distance in an advancing direction and a horizontal direction of the human-powered vehicle 10 based on the first movement distance and the pitch angle of the human-powered vehicle 10 and calculating a third movement distance related to movement in the advancing direction and the vertical direction of the human-powered vehicle 10 based on the first movement distance and the pitch angle, and a third process of predicting the terrain of the road based on the second movement distance and the third movement distance.

In the second process, the pitch angle is obtained, for example, from the pitch angle detector 68. The second process includes, for example, multiplying the first movement distance by cosine of the pitch angle to calculate the second movement distance. The second process includes, for example, multiplying the first movement distance by sine of the pitch angle to calculate the third movement distance.

The third process includes, for example, predicting continuous terrain of the road from an accumulation of the second movement distance and an accumulation of the third movement distance. The third process can include, for example, calculating coordinate information from the second movement distance and the third movement distance. The third process can include, for example, predicting continuous terrain of the road from the coordinate information obtained from the second movement distance and the third movement distance. The third process can include, for example, connecting the coordinate information obtained from the second movement distance and the third movement distance using a straight line. In an example, the electronic controller 82 is configured to predict continuous terrain of the road from the first to third processes.

The control method for a human-powered vehicle includes, for example, a fourth process of storing at least one of the second movement distance, the third movement distance, and the terrain predicted in the third process in the storage 84. The control method for a human-powered vehicle further includes, for example, a fifth process of generating first display information for showing at least one of the second movement distance, the third movement distance, and the terrain predicted in the third process on the display 62. In an example, the first display information includes information for displaying continuous terrain of the road with a first graphic on the display 62. The first graphic includes, for example, a two-dimensional graph expressed by a traveling direction of the human-powered vehicle 10 and the altitude. The first display information can be the same as the terrain included in the first information of the first embodiment and the display information of the fifth embodiment.

The control method for a human-powered vehicle further includes, for example, a sixth process of predicting curving of the road from the roll angle of the human-powered vehicle 10. In the sixth process, in a case where the roll angle of the human-powered vehicle 10 is greater than or equal to a predetermined roll angle, the electronic controller 82 can predict that the road has curving.

The control method for a human-powered vehicle further includes, for example, a seventh process of generating information related to a traveling route including the terrain predicted in the third process and the curving predicted in the sixth process from the terrain predicted in the third process and the curving predicted in the sixth process. The information related to the traveling route including the terrain predicted in the third process and the curving predicted in the sixth process from the terrain predicted in the third process and the curving predicted in the sixth process includes, for example, information for showing the terrain and the curving of the road on the display device. The information for showing the terrain and the curving of the road on the display device includes, for example, at least one of a two-dimensional graph and a three-dimensional graph.

The third process includes, for example, predicting continuous terrain of the road from an accumulation of the second movement distance, an accumulation of the third movement distance, and an accumulation of the curving. The control method for a human-powered vehicle further includes, for example, an eighth process of generating second display information to display the continuous terrain of the road on the display 62. The eighth process includes, for example, generating second display information for showing the continuous terrain of the road that is predicted from an accumulation of the second movement distance, an accumulation of the third movement distance, and an accumulation of the curving on the display 62. In an example, the second display information includes information for displaying continuous terrain of the road with a second graphic on the display 62. The second display information includes, for example, information for showing the continuous terrain of the road that is predicted from an accumulation of the second movement distance, an accumulation of the third movement distance, and an accumulation of the curving with the second graphic on the display 62. The second display information includes information for displaying the second graphic together with a map on the display 62. The second graphic includes, for example, a two-dimensional graph expressed by a traveling direction of the human-powered vehicle 10 and the altitude.

The control method for a human-powered vehicle includes, for example, a ninth process of storing at least one of the second movement distance, the third movement distance, the terrain predicted in the third process, and the curving predicted in the sixth process in the storage 84. In a case where the control method for a human-powered vehicle includes the ninth process, the fourth process can be omitted.

The third process can include a tenth process of smoothing the terrain predicted from the second movement distance and the third movement distance in a case where a changing amount of the predicted terrain is greater than or equal to a predetermined changing amount. In an example, the third process includes using straight lines to express the terrain predicted from the second movement distance and the third movement distance. In an example, the tenth process includes smoothing the predicted terrain with an envelope related to the straight lines in a case where an angle formed by two of the straight lines is greater than or equal to a predetermined angle.

In an example, the electronic controller 82 determines the terrain by an envelope that is in contact with all of the straight lines of the terrain predicted from the second movement distance and the third movement distance. In an example, the electronic controller 82 determines the terrain by an envelope that is in contact with all of the straight lines of the terrain predicted in each predetermined travel range. The tenth process can include smoothing the predicted terrain of the road using an approximate curve based on aggregation of the coordinate information related to the predicted terrain.

The third process can include predicting the terrain from the second movement distance, the third movement distance, and whether the wheel 12 of the human-powered vehicle 10 is in contact with the road. In an example, in a case where the wheel 12 is not in contact with the road, the electronic controller 82 predicts that the terrain is lower than a terrain predicted from the second movement distance and the third movement distance. The third process can include determining whether the wheel 12 is in contact with the road based on a detection result of at least one of the air pressure sensor 44C, which detects air pressure of the wheel 12, and a ranging sensor that detects a distance between the wheel axle 12A and the ground. The third process can include subtracting the distance between the wheel axle 12A and the ground from the terrain predicted from the second movement distance and the third movement distance.

Figure 21:
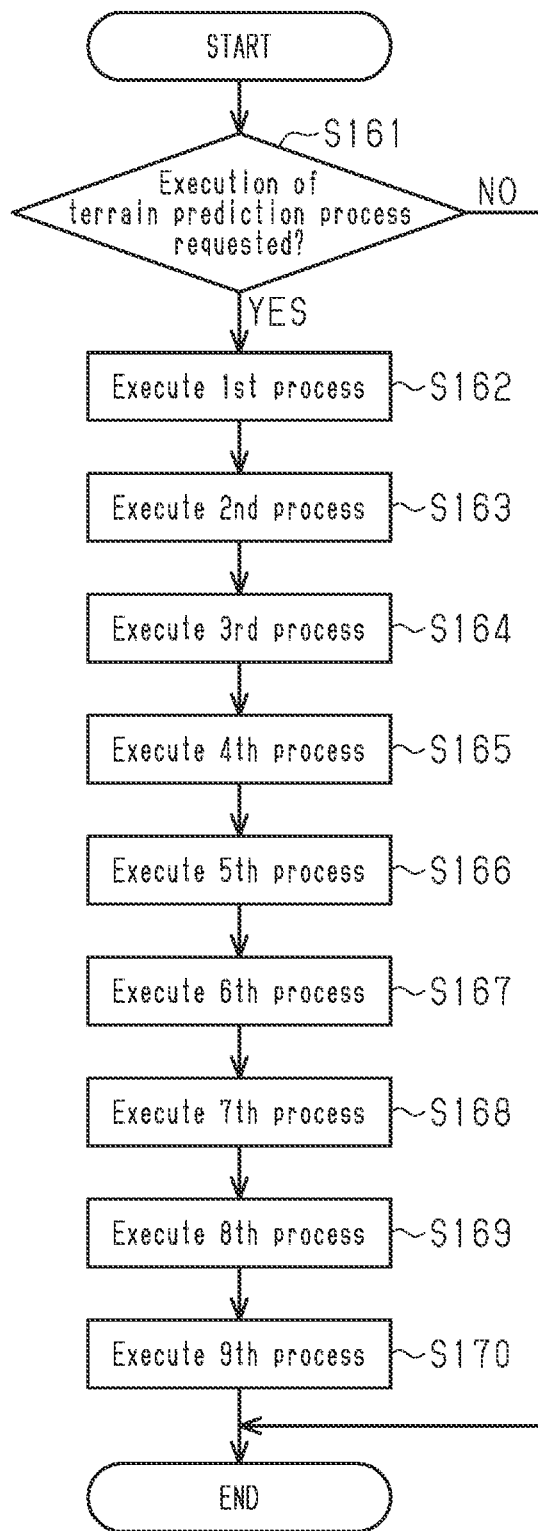
FIG. 21 is a flowchart of a process for predicting terrain executed by the electronic controller shown in FIG. 19.

A process executed by the electronic controller 82 using the control method for a human-powered vehicle will now be described with reference to FIG. 21. For example, in a case where electric power is supplied to the electronic controller 82, the electronic controller 82 starts the process and proceeds to step S161 of the flowchart shown in FIG. 21. In a case where the flowchart shown in FIG. 21 ends, the electronic controller 82 repeats the process from step S161 after a predetermined interval, for example, until the supply of electric power stops.

In step S161, the electronic controller 82 determines whether execution of the terrain prediction process is requested. In an example, in a case where a signal related to the execution request of the terrain prediction process is transmitted from the information processing device, the electronic controller 82 determines that execution of the terrain prediction process is requested. In a case where execution of the terrain prediction process is requested, the electronic controller 82 proceeds to step S162. In a case where execution of the terrain prediction process is not requested, the electronic controller 82 ends the process.

In step S162, the electronic controller 82 executes the first process and then proceeds to step S163. In step S163, the electronic controller 82 executes the second process and then proceeds to step S164. In step S164, the electronic controller 82 executes the third process and then proceeds to step S165. In step S165, the electronic controller 82 executes the fourth process and then proceeds to step S166. In step S166, the electronic controller 82 executes the fifth process and then proceeds to step S167. In step S167, the electronic controller 82 executes the sixth process and then proceeds to step S168. In step S168, the electronic controller 82 executes the seventh process and then proceeds to step S169. In step S169, the electronic controller 82 executes the eighth process and then proceeds to step S170. In step S170, the electronic controller 82 executes the ninth process and then ends the process.

The electronic controller 82 can omit execution of at least one of steps S165 and S166. The electronic controller 82 can switch the order of steps S165 to S167 and execute steps S165 to S167. The electronic controller 82 can omit execution of steps S167 to S170. The electronic controller 82 can switch the order of steps S168 to S170 and execute steps S168 to S170. The electronic controller 82 can omit execution of steps S165 to S170. In a case where steps S165 to S170 are omitted, for example, the electronic controller 82 can be configured to predict the terrain of the road from the second movement distance and the third movement distance in step S164 and then ends the process.

Figure 22:
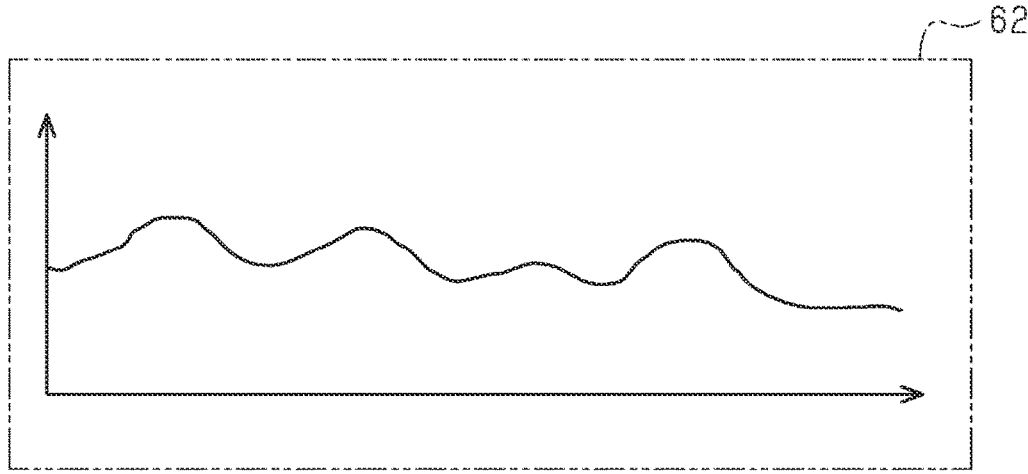
FIG. 22 is a diagram showing an example of first display information shown on a display.

For example, in step S166, the electronic controller 82 shows the generated first display information on the display 62. FIG. 22 shows an example of the first graphic including a two-dimensional graph. For example, in step S169, the electronic controller 82 shows the generated second display information on the display 62. The first display information can be the same as the second display information. The first graphic can be the same as the second graphic. The horizontal axis of the two-dimensional graph shown in FIG. 22 corresponds to, for example, the second movement distance. The vertical axis of the two-dimensional graph shown in FIG. 22 corresponds to, for example, the third movement distance.

Eighth Embodiment

Figure 23:
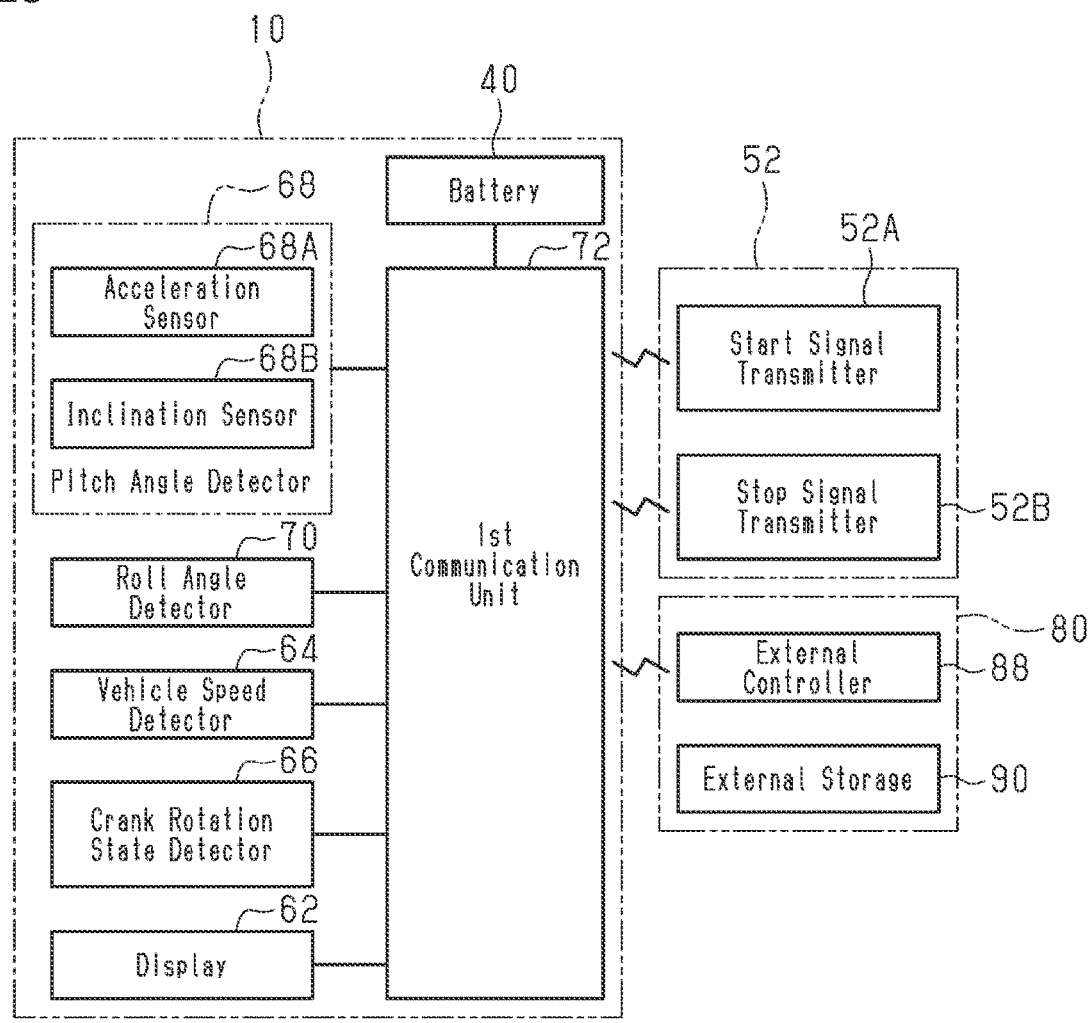
FIG. 23 is a block diagram showing the electrical configuration of a human-powered vehicle including an eighth embodiment of a human-powered vehicle control device.

An eighth embodiment of a control device 80 for a human-powered vehicle will now be described with reference to FIGS. 1 and 23. In the human-powered vehicle control device 80 of the eighth embodiment, the same reference characters are given to those components that are the same as the corresponding components of the first and fourth to seventh embodiments. Such components will not be described in detail.

In the eighth embodiment, for example, the human-powered vehicle 10 includes the vehicle speed detector 64 and the crank rotation state detector 66. In the eighth embodiment, for example, the human-powered vehicle 10 further includes the pitch angle detector 68 and the roll angle detector 70.

In the eighth embodiment, the control device 80 for a human-powered vehicle includes an electronic external controller 88 provided outside the human-powered vehicle 10. The electronic external controller 88 is configured to execute the control method for a human-powered vehicle. The electronic external controller 88 includes, for example, a processor that executes a predetermined control program. In an example, the processor includes a CPU or an MPU. The electronic external controller 88 can include one or more microcomputers. The electronic external controller 88 can include multiple processors arranged at separate locations. In an example, the electronic external controller 88 is included in the information processing device. In an example, the information processing device includes at least one of a personal computer, a smartphone, a tablet computer, and a server. In an example, the electronic external controller 88 is configured to execute the process executed by the electronic controller 82 of the seventh embodiment instead of the electronic controller 82 of the seventh embodiment.

The human-powered vehicle 10 further includes a first communication unit 72 configured to communicate with the electronic external controller 88. The first communication unit 72 includes, for example, one or more processors that executes a predetermined control program. In an example, the processor includes a CPU or an MPU. The first communication unit 72 can include one or more microcomputers. The first communication unit 72 can include multiple processors arranged at separate locations.

The first communication unit 72 is connected to at least one of the battery 40, the display 62, the vehicle speed detector 64, the crank rotation state detector 66, the pitch angle detector 68, and the roll angle detector 70 through wired or wireless communication. In an example, the first communication unit 72 is connected to at least one of the start signal transmitter 52A, the stop signal transmitter 52B, and the electronic external controller 88 through wired or wireless communication. In an example, the first communication unit 72 is configured to transmit information related to a detection result of at least one of the vehicle speed detector 64, the crank rotation state detector 66, the pitch angle detector 68, and the roll angle detector 70 to the electronic external controller 88. In an example, the first communication unit 72 is configured to receive a signal from at least one of the start signal transmitter 52A and the stop signal transmitter 52B.

In an example, the control device 80 further includes external storage 90. The external storage 90 stores, for example, control programs and information used for various control processes. The external storage 90 is configured to continuously store at least one of the rotational speed of the wheel 12, the rotational amount of the wheel 12, the pitch angle of the human-powered vehicle 10, and the roll angle of the human-powered vehicle 10. The external storage 90 stores, for example, a program related to the control device 80 for a human-powered vehicle. The storage 90 is any computer storage device or any non-transitory computer-readable medium with the sole exception of a transitory, propagating signal. The external storage 90 includes, for example, at least one of a nonvolatile memory and a volatile memory. The nonvolatile memory includes, for example, at least one of ROM, EPROM, EEPROM, and flash memory. The volatile memory includes, for example, RAM. The external storage 90 is, for example, configured to perform wired or wireless communication with the electronic controller 82.

In a case where the control device 80 includes the electronic external controller 88, the control method can further include an eleventh process of predicting the terrain of the road from a trajectory of the vehicle body 14 of the human-powered vehicle 10 acquired by optical motion capture. The electronic external controller 88 can be configured to execute the eleventh process. In a case where the control method further includes the eleventh process, the human-powered vehicle 10 further includes, for example, a motion capturing marker. In an example, the electronic external controller 88 is configured to obtain information related to the trajectory of the vehicle body 14 of the human-powered vehicle 10 detected by a marker detector. The marker detector is provided outside the human-powered vehicle 10 and detects a motion capturing marker. The marker detector includes, for example, a camera.

Modifications

The description related to the above embodiments exemplifies, without any intention to limit, applicable forms of a control device for a human-powered vehicle, a detection device for a human-powered vehicle, and a method for controlling a human-powered vehicle according to the present disclosure. The control device for a human-powered vehicle, the detection device for a human-powered vehicle, and the method for controlling a human-powered vehicle according to the present disclosure can be applied to, for example, modifications of the embodiments that are described below and combinations of at least two of the modifications that do not contradict each other. In the modifications described hereafter, same reference characters are given to those elements that are the same as the corresponding elements of the above embodiments. Such elements will not be described in detail.

Two or three of the first, second, and third embodiments can be combined. In an example, the electronic controller 82 is configured to stop the storage 84 from continuously storing the predetermined information in at least one of a case where the gradient of the road corresponds to an uphill and is greater than or equal to the first angle, a case where the gradient of the road corresponds to a downhill and is greater than or equal to the second angle, and a case where the pitch angle of the human-powered vehicle 10 is greater than or equal to the third angle and at least one of a case where an impact applied to the human-powered vehicle 10 is detected, a case where the vehicle speed is greater than or equal to the first speed, and a case where the acceleration is greater than or equal to the first acceleration.

In the first to third embodiments, the human-powered vehicle 10 includes at least one of the operation detector 44 that detects the first parameter correlated to the predetermined operation performed by a rider on the human-powered vehicle 10, the terrain detector 46 that detects the second parameter correlated to the terrain of the road on which the human-powered vehicle 10 is traveling, and the travel detector 48 that detects at least one of the traveling state and the traveling environment of the human-powered vehicle 10. The control device 80 includes the electronic controller 82 and the storage 84 configured to continuously store the predetermined information including the first parameter and the second parameter. In a state where the storage 84 is continuously storing the predetermined information, the electronic controller 82 is configured to stop the storage 84 from continuously storing the predetermined information in accordance with an output from the travel detector 48. As long as the first to third embodiments include the configuration described above, the remaining configuration can be omitted.

In the fourth embodiment, the human-powered vehicle 10 includes at least one of the operation detector 44 that detects the first parameter correlated to the predetermined operation performed by a rider on the human-powered vehicle 10 and the terrain detector 46 that detects the second parameter correlated to the terrain of the road on which the human-powered vehicle 10 is traveling. The control device 80 includes the electronic controller 82 and the storage 84 configured to continuously store the predetermined information including at least one of the first parameter and the second parameter. In a case where a predetermined condition is satisfied while the storage 84 is storing predetermined information, the electronic controller 82 is configured to temporality stop the storage 84 from storing the predetermined information over the predetermined period. As long as the fourth embodiment includes the configuration described above, the remaining configuration can be omitted.

In the fifth embodiment, the human-powered vehicle 10 includes the operation detector 44 that detects a first parameter correlated to a predetermined operation performed by the rider on the human-powered vehicle 10. The control device 80 includes the electronic controller 82 and the storage 84 configured to store the first parameter. The electronic controller 82 is configured to store the first parameter in the storage 84. The operation detector 44 is provided on at least one of the frame 16 of the human-powered vehicle 10, the fork 26 of the human-powered vehicle 10, and the wheel 12 of the human-powered vehicle 10. The predetermined operation includes at least one of the first operation in which the rider pushes the handlebar 28 of the human-powered vehicle 10 and the second operation in which the rider pulls the handlebar 28. As long as the fifth embodiment includes the configuration described above, the remaining configuration can be omitted.

In the fifth embodiment, the human-powered vehicle 10 includes at least one of the operation detector 44 that detects the first parameter correlated to the predetermined operation performed by a rider on the human-powered vehicle 10, the terrain detector 46 that detects the second parameter correlated to the terrain of the road on which the human-powered vehicle 10 is traveling, and the suspension 42. The terrain detector 46 is provided on at least one of the wheel axle 12A of the human-powered vehicle 10 and a portion of the human-powered vehicle 10 closer to the wheel axle 12A than the moving portion of the suspension 42. The control device 80 includes the electronic controller 82. The electronic controller 82 is configured to generate first information associating the predetermined operation and the terrain base on the first parameter and the second parameter. The predetermined operation includes at least one of the first operation in which the rider pushes the handlebar 28 of the human-powered vehicle 10 and the second operation in which the rider pulls the handlebar 28. As long as the fifth embodiment includes the configuration described above, the remaining configuration can be omitted.

In the fifth embodiment, the human-powered vehicle 10 includes the operation detector 44 detecting the first parameter correlated to the predetermined operation performed by the rider on the human-powered vehicle 10 and the display 62 configured to show operation information related to the predetermined information. The control device 80 includes the electronic controller 82 and the storage 84 configured to store the first parameter. The electronic controller 82 is configured to show the first parameter stored in the storage 84 on the display 62. The predetermined operation includes at least one of the first operation in which the rider pushes the handlebar 28 of the human-powered vehicle 10 and the second operation in which the rider pulls the handlebar 28. As long as the fifth embodiment includes the configuration described above, the remaining configuration can be omitted.

In the fifth embodiment, the detection device 60 includes the operation detector 44 that detects the first parameter correlated to the predetermined operation performed by the rider on the human-powered vehicle 10. The operation detector 44 includes the strain sensor 44B. The strain sensor 44B is provided on at least one of the frame 16 of the human-powered vehicle 10 and the fork 26 of the human-powered vehicle 10. The predetermined operation includes at least one of the first operation in which the rider pushes the handlebar 28 of the human-powered vehicle 10 and the second operation in which the rider pulls the handlebar 28. As long as the fifth embodiment includes the configuration described above, the remaining configuration can be omitted.

In the sixth embodiment, the human-powered vehicle 10 includes the operation detector 44 that detects a first parameter correlated to a predetermined operation performed by the rider on the human-powered vehicle 10 and the suspension 42. The operation detector 44 includes the acceleration sensor 44A. The acceleration sensor 44A is provided on at least one of the wheel axle 12A of the human-powered vehicle 10 and a portion of the human-powered vehicle 10 closer to the wheel axle 12A than the moving portion of the suspension 42. The first parameter includes acceleration in the fore-aft direction of the human-powered vehicle 10. The control device 80 includes the electronic controller 82. The electronic controller 82 is configured to determine the predetermined operation based on acceleration in the fore-aft direction. The predetermined operation includes at least one of the first operation in which the rider pushes the handlebar 28 of the human-powered vehicle 10 and the second operation in which the rider pulls the handlebar 28. As long as the fifth embodiment includes the configuration described above, the remaining configuration can be omitted.

In the sixth embodiment, the human-powered vehicle 10 includes the suspension 42 and the terrain detector 46 that detects the second parameter correlated to the terrain of the road on which the human-powered vehicle 10 is traveling. The terrain detector 46 includes the first acceleration sensor 46A. The first acceleration sensor 46A is provided on at least one of the wheel axle 12A of the human-powered vehicle 10 and a portion of the human-powered vehicle 10 closer to the wheel axle 12A than the moving portion of the suspension 42. The second parameter includes acceleration in a vertical direction of the human-powered vehicle 10. The control device 80 includes the electronic controller 82 and the storage 84. The electronic controller 82 is configured to determine unevenness of the road from acceleration in the vertical direction. The electronic controller 82 is configured to store the determination related to unevenness of the road in the storage 84. As long as the sixth embodiment includes the configuration described above, the remaining configuration can be omitted.

In the sixth embodiment, the human-powered vehicle 10 includes the suspension 42 and the terrain detector 46 that detects the second parameter correlated to the terrain of the road on which the human-powered vehicle 10 is traveling. The terrain detector 46 includes the second acceleration sensor 46B. The second acceleration sensor 46B is provided on at least one of the wheel axle 12A of the human-powered vehicle 10 and a portion of the human-powered vehicle 10 closer to the wheel axle 12A than the moving portion of the suspension 42. The second parameter includes acceleration in the lateral direction of the human-powered vehicle 10. The control device 80 includes the electronic controller 82. The electronic controller 82 is configured to determine curving of the road from the acceleration in the lateral direction. As long as the sixth embodiment includes the configuration described above, the remaining configuration can be omitted.

In the seventh and eighth embodiments, the control method for a human-powered vehicle includes a first process of calculating a first movement distance on the road on which the human-powered vehicle 10 is traveling based on at least one of the rotational speed of the wheel 12 of the human-powered vehicle 10 and the rotational amount of the wheel 12, a second process of calculating a second movement distance in an advancing direction and a horizontal direction of the human-powered vehicle 10 based on the first movement distance and the pitch angle of the human-powered vehicle 10 and calculating a third movement distance related to movement in the advancing direction and the vertical direction of the human-powered vehicle 10 based on the first movement distance and the pitch angle, and a third process of predicting the terrain of the road based on the second movement distance and the third movement distance. As long as the seventh and eighth embodiments include the configuration described above, the remaining configuration can be omitted.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, in this specification, the phrase "at least one of" as used in this disclosure means "only one single choice" or "any combination of equal to or more than two choices" if the number of its choices is equal to or more than three.

What is claimed is:

1. A method for controlling a human-powered vehicle, the method comprising:
    a first process of calculating a first movement amount of the human-powered vehicle on a road from at least one of a rotational speed of a wheel of the human-powered vehicle and a rotational amount of the wheel;
    a second process of calculating a second movement distance in an advancing direction of the human-powered vehicle and a horizontal direction from the first movement distance and a pitch angle of the human-powered vehicle and calculating a third movement distance related to movement in the advancing direction of the human-powered vehicle and a vertical direction from the first movement distance and the pitch angle; and
    a third process of predicting a terrain of the road from the second movement distance and the third movement distance.

2. The method according to claim 1, wherein
    the second process includes multiplying the first movement distance by a cosine of the pitch angle to calculate the second movement distance.

3. The method according to claim 1, wherein
    the second process includes multiplying the first movement distance by a sine of the pitch angle to calculate the third movement distance.

4. The method according to claim 1, further comprising:
    a fourth process of storing at least one of the second movement distance, the third movement distance, and the terrain predicted in the third process in storage.

5. The method according to claim 1, wherein
    the third process includes predicting continuous terrain of the road from an accumulation of the second movement distance and an accumulation of the third movement distance.

6. The method according to claim 1, further comprising:
    a fifth process of generating first display information to display at least one of the second movement distance, the third movement distance, and the terrain predicted in the third process on a display.

7. The method according to claim 6, wherein
    the third process includes predicting continuous terrain of the road from an accumulation of the second movement distance and an accumulation of the third movement distance.

8. The method according to claim 7, wherein
    the first display information includes information for displaying the continuous terrain of the road with a first graphic on the display.

9. The method according to claim 1, further comprising:
    a sixth process of predicting curving of the road from a roll angle of the human-powered vehicle.

10. The method according to claim 9, further comprising:
    a seventh process of generating information related to a traveling route including the terrain predicted in the third process and the curving predicted in the sixth process from the terrain predicted in the third process and the curving predicted in the sixth process.

11. The method according to claim 1, further comprising:
    a sixth process of predicting curving of the road from a roll angle of the human-powered vehicle,
    the third process including predicting continuous terrain of the road from an accumulation of the second movement distance, an accumulation of the third movement distance, and an accumulation of the curving.

12. The method according to claim 11, further comprising:
    an eighth process of generating second display information to display the continuous terrain of the road on a display.

13. The method according to claim 12, wherein
the second display information includes displaying the continuous terrain of the road with a second graphic on the display.

14. The method according to claim 13, wherein
the second display information includes information for displaying the second graphic together with a map on the display.

15. The method according to claim 9, further comprising:
a ninth process of storing at least one of the second movement distance, the third movement distance, the terrain predicted in the third process, and the curving predicted in the sixth process in the storage.

16. The method according to claim 1, wherein
the third process includes a tenth process of smoothing the terrain predicted from the second movement distance and the third movement distance in a case where a changing amount of the predicted terrain is greater than or equal to a predetermined changing amount.

17. The method according to claim 16, wherein:
the third process includes using straight lines to express the terrain predicted from the second movement distance and the third movement distance; and
the tenth process includes smoothing the predicted terrain with an envelope related to the straight lines in a case where an angle formed by two of the straight lines is greater than or equal to a predetermined angle.

18. The method according to claim 17, wherein
the second process includes obtaining the pitch angle from a pitch angle detector provided on a wheel axle of the human-powered vehicle.

19. The method according to claim 18, wherein
the third process includes predicting the terrain from the second movement distance, the third movement distance, and whether the wheel of the human-powered vehicle is in contact with the road.

20. A control device for a human-powered vehicle, the control device comprising:
an electronic controller provided on the human-powered vehicle,
the electronic controller being configured to perform the method according to claim 1.

21. The control device according to claim 20, wherein
the electronic controller is configured to obtain a detection result of a pitch angle detector provided on the human-powered vehicle to detect the pitch angle, and
the pitch angle detector includes at least one of an acceleration sensor and an inclination sensor.

22. A control device for a human-powered vehicle, the control device comprising:
an electronic external controller provided outside the human-powered vehicle,
the electronic external controller being configured to perform the method according to claim 1.

* * * * *